United States Patent
Campbell et al.

(10) Patent No.: US 9,919,254 B2
(45) Date of Patent: *Mar. 20, 2018

(54) FILTER ARRANGEMENTS; COMPONENTS; ASSEMBLIES; AND, METHODS

(71) Applicant: Donaldson Company, Inc., Minneapolis, MN (US)

(72) Inventors: Steven Campbell, Lakeville, MN (US); Steven Gieseke, Richfield, MN (US); Andrew Albitz, Mulberry, IN (US)

(73) Assignee: Donaldson Company, Inc., Minneapolis, MN (US)

( * ) Notice: Subject to any disclaimer, the term of this patent is extended or adjusted under 35 U.S.C. 154(b) by 218 days.

This patent is subject to a terminal disclaimer.

(21) Appl. No.: 14/809,414

(22) Filed: Jul. 27, 2015

(65) Prior Publication Data

US 2015/0328575 A1 Nov. 19, 2015

Related U.S. Application Data

(63) Continuation of application No. 13/833,002, filed on Mar. 15, 2013, now Pat. No. 9,089,804.

(Continued)

(51) Int. Cl.
*B01D 46/24* (2006.01)
*B01D 46/00* (2006.01)
(Continued)

(52) U.S. Cl.
CPC ..... *B01D 46/2414* (2013.01); *B01D 46/0001* (2013.01); *B01D 46/0004* (2013.01); *B01D 46/2411* (2013.01); *B01D 46/521* (2013.01); *B29C 70/845* (2013.01); *F02M 35/0245* (2013.01); *B01D 2201/291* (2013.01); *B01D 2201/347* (2013.01); *B01D 2265/021* (2013.01);

(Continued)

(58) Field of Classification Search
CPC ............ B01D 46/2411; B01D 46/2414; B01D 2271/025; B01D 2271/027; B01D 2201/291; B01D 2201/34; B01D 2201/347
USPC ........................ 55/498, 502, 510; 210/493.2
See application file for complete search history.

(56) References Cited

U.S. PATENT DOCUMENTS

| 5,484,466 A | 1/1996 | Brown et al. |
| 5,685,985 A | 11/1997 | Brown et al. |

(Continued)

FOREIGN PATENT DOCUMENTS

| DE | 19944344 B4 | 6/2004 |
| DE | 20 2006 019 011 | 4/2008 |

(Continued)

OTHER PUBLICATIONS

Pending claims of U.S. Appl. No. 14/441,090 dated Dec. 22, 2016.

(Continued)

*Primary Examiner* — Robert Clemente
(74) *Attorney, Agent, or Firm* — Merchant & Gould P.C.

(57) ABSTRACT

Filter cartridge arrangements, features, and methods of construction are described. Also described are filter assemblies having the filter cartridge installed therein as a removable service component. The filter cartridge generally comprises a media pack having an end with an end cap positioned thereon. The end cap includes an end cap section, a seal support and a seal member secured thereto. Methods of assembly and use are described.

16 Claims, 19 Drawing Sheets

Related U.S. Application Data

(60) Provisional application No. 61/728,091, filed on Nov. 19, 2012.

(51) Int. Cl.
  *B01D 46/52* (2006.01)
  *F02M 35/024* (2006.01)
  *B29C 70/84* (2006.01)
  *B29L 31/14* (2006.01)

(52) U.S. Cl.
  CPC .. *B01D 2271/025* (2013.01); *B01D 2271/027* (2013.01); *B29L 2031/14* (2013.01)

(56) References Cited

U.S. PATENT DOCUMENTS

| | | | |
|---|---|---|---|
| 5,730,769 A | 3/1998 | Dungs et al. |
| 5,736,040 A | 4/1998 | Duerrstein et al. |
| 5,893,937 A | 4/1999 | Moessinger |
| 5,916,435 A | 6/1999 | Spearman |
| 6,004,366 A | 12/1999 | Engel et al. |
| 6,149,700 A | 11/2000 | Morgan |
| 6,238,561 B1 | 5/2001 | Nelson |
| 6,261,334 B1 | 7/2001 | Morgan |
| 6,306,193 B1 | 10/2001 | Morgan |
| 6,375,700 B1 | 4/2002 | Jaroszczyk |
| 6,383,244 B1 | 5/2002 | Nelson |
| 6,391,076 B1 | 5/2002 | Jaroszczyk |
| 6,398,832 B2 | 6/2002 | Morgan |
| 6,416,561 B1 | 7/2002 | Kallsen et al. |
| 6,447,567 B1 | 9/2002 | Ehrenberg |
| 6,482,247 B2 | 11/2002 | Jaroszczyk |
| 6,511,599 B2 | 1/2003 | Jaroszczyk |
| 6,599,342 B2 | 7/2003 | Andress et al. |
| 6,602,308 B1 | 8/2003 | Carle et al. |
| 6,641,637 B2 | 11/2003 | Nelson |
| 6,662,954 B2 | 12/2003 | Gottwald-Grill et al. |
| 6,902,598 B2 | 6/2005 | Gunderson et al. |
| 7,059,481 B2 | 6/2006 | Kochert et al. |
| 7,090,708 B2 | 8/2006 | Winter et al. |
| 7,097,694 B1 | 8/2006 | Jaroszczyk |
| 7,115,156 B2 | 10/2006 | Schaerlund et al. |
| 7,258,718 B2 | 8/2007 | Dworatzek et al. |
| 7,267,706 B2 | 9/2007 | Schaerlund et al. |
| 7,314,558 B1 | 1/2008 | Jaroszczyk |
| 7,323,105 B1 | 1/2008 | Janikowski |
| 7,323,106 B2 | 1/2008 | Jaroszczyk |
| 7,413,588 B2 | 8/2008 | Holzmann |
| 7,628,837 B2 | 12/2009 | Ehrenberg |
| 7,828,870 B1 | 1/2010 | Rech |
| 7,658,777 B2 | 2/2010 | Kopec et al. |
| 7,740,679 B2 | 6/2010 | Ehrenberg |
| RE41,713 E | 9/2010 | Gunderson et al. |
| 7,815,705 B2 | 10/2010 | Ehrenberg |
| RE42,174 E | 3/2011 | Gunderson et al. |
| 8,016,922 B2 | 9/2011 | Ehrenberg |
| 8,152,876 B2 | 4/2012 | Gillenberg et al. |
| 8,424,686 B2 | 4/2013 | Ehrenberg |
| 9,089,804 B2 | 7/2015 | Campbell et al. |
| 2003/0146149 A1 | 8/2003 | Binder et al. |
| 2003/0184025 A1 | 10/2003 | Matsuki |
| 2004/0068970 A1 | 4/2004 | Hasegawa et al. |
| 2004/0084360 A1 | 5/2004 | Janik et al. |
| 2004/0084361 A1 | 5/2004 | Janik et al. |
| 2006/0054547 A1 | 3/2006 | Richmond et al. |
| 2006/0261002 A1 | 11/2006 | Dworatzek et al. |
| 2007/0163945 A1 | 7/2007 | Ehrenberg |
| 2011/0017657 A1 | 1/2011 | Jokschas et al. |
| 2011/0247582 A1 | 10/2011 | Blossey et al. |
| 2011/0259199 A1 | 10/2011 | Blossey et al. |
| 2015/0292448 A1* | 10/2015 | Campbell .......... B01D 46/2414 55/502 |

FOREIGN PATENT DOCUMENTS

| | | |
|---|---|---|
| DE | 10 2006 054 447 | 5/2008 |
| DE | 102006054447 | 5/2008 |
| DE | 10 2005 008 686 | 9/2010 |
| EP | 1 144 078 | 4/2003 |
| EP | 1 123 460 | 8/2003 |
| EP | 1 354 617 | 10/2003 |
| EP | 1 133 341 B1 | 3/2004 |
| EP | 1 409 112 | 6/2006 |
| GB | 2 005 777 | 4/1979 |
| WO | 97/22394 | 6/1997 |
| WO | 2004/041403 | 5/2004 |

OTHER PUBLICATIONS

International Search Report corresponding to PCT/US2013/070585.
Allowed claims of U.S. Appl. No. 13/833,002 dated Jul. 27, 2015.
Pending claims of U.S. Appl. No. 14/441,090 dated Jul. 27, 2015.

* cited by examiner

US 9,919,254 B2

FILTER ARRANGEMENTS; COMPONENTS; ASSEMBLIES; AND, METHODS

CROSS-REFERENCE TO RELATED APPLICATIONS

The above referenced application is a continuation of U.S. Ser. No. 13/833,002, filed Mar. 15, 2013, which issued as U.S. Pat. No. 9,089,804 on Jul. 28, 2015. U.S. Ser. No. 13/833,002 includes, with edits, the disclosure of U.S. Ser. No. 61/728,091, filed Nov. 19, 2012. The complete disclosures of U.S. Ser. No. 13/833,002 and U.S. Ser. No. 61/728,091 are incorporated herein by reference. A claim of priority to each of U.S. Ser. No. 13/833,002 and U.S. Ser. No. 61/728,091 is made to the extent appropriate.

Attention is directed to related U.S. Ser. No. 14/441,090, filed May 6, 2015.

FIELD OF THE DISCLOSURE

The present disclosure relates to filter assemblies. In particularly concerns filter cartridges and features that are usable as service parts in filter assemblies, such as air (gas) cleaner assemblies. In certain specific examples, the filter cartridges include an end cap or end piece arrangement comprising a performed seal member non-removably secured in place on, and typically molded-in-place on, an end piece; the end piece having a radial seal support thereon.

BACKGROUND

A variety of filter assemblies are known in which a serviceable filter cartridge is positioned within a filter housing. By the term "serviceable", in this context, it is meant that the filter cartridge is a service component that is installed in the housing, and through the lifetime of the equipment involved, is removed and refurbished or replaced. Examples of such assemblies include, for example, air cleaner assemblies used to filter engine intake air for internal combustion engines. Such assemblies are used, for example, on vehicles and other equipment.

The serviceable filter cartridges are provided with a housing seal arrangement thereon. A housing seal arrangement is an arrangement that forms a releasable seal with an appropriate portion of a housing, when the serviceable filter cartridge is installed for use. The housing seal arrangement should be securely positioned, be protected from damage during manufacture, handling and use; and, be readily engagable upon installation, while also being readily disengageable when the cartridge is removed from the housing for servicing.

In general, improvements in filter cartridges with respect to the housing seal arrangement are sought, in order to achieve advancement in accomplishment of the above objectives. Improved arrangements and processes for assembly are described herein.

SUMMARY

According to an aspect of the present disclosure, a filter cartridge is provided. The filter cartridge can be configured, for example, as a gas (air) filter cartridge, although the principles can be applied in other applications.

In a typical application, the filter cartridge comprises a filter media pack. Typically the media pack is positioned surrounding and defining an open filter interior, although alternatives are possible. Such a media pack typically extends between first and second media pack ends. The media pack may include pleated media, but alternatives are possible.

The cartridge includes an end piece having a central gas flow aperture therethrough. The end piece is typically molded-in-place on an end of the media pack. The typical end piece comprises an end cap section and a seal support section. The end cap section and seal support section are typically formed integral with one another, for example molded from a moldable material. The seal support section generally projects away from the media pack and, preferably, defines a seal support wall that slants radially as it extends away from the end cap section, to define a seal recess.

A housing seal member is removably secured within the seal recess (when present) and configured to form a releasable, radially directed, seal with a housing component, when the filter cartridge is installed for use.

The present disclosure also relates to preferred seal arrangements, methods of manufacture and assembly, and related cartridge features and filter assemblies.

There is no specific requirement that a filter cartridge, feature or component; or, a filter assembly, feature or component, include all of the feature detail and include applications of all of the techniques characterized herein, in order to obtain some benefit according to the present disclosure.

DETAILED DESCRIPTION

I. An Example Filter Cartridge and Filter Assembly, FIG. 1-12

Figure 1:
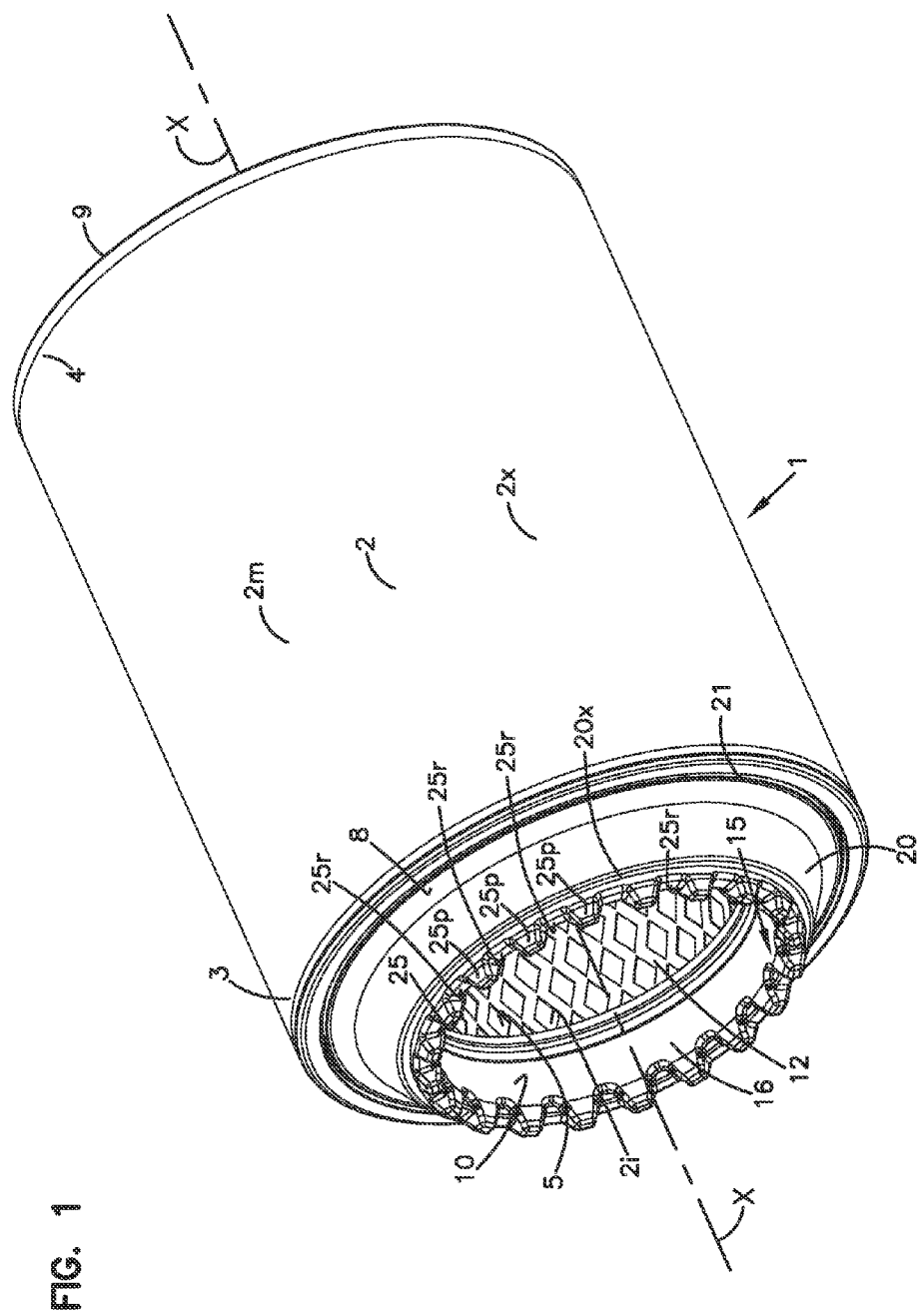
FIG. 1 is a schematic, open end, perspective view of a filter cartridge according to the present disclosure.

Reference numeral 1, FIG. 1, generally represents an example filter cartridge incorporating features in accord with the present disclosure. The filter cartridge 1 depicted is configured as a gas filter cartridge, for example as would be used for filtering air; although techniques described herein can be applied in a variety of alternate constructions. In general, filter cartridge 1 comprises filter media 2m, or a media pack 2, through which gas (air) to be filtered is passed during a filtering operation.

The particular filter cartridge 1 depicted, comprises a media pack 2 including media 2m extending between first and second media ends 3, 4. In the example, the media pack 2 is configured to extend around an open filter interior 5, and a central axis X. This would be typical for application of techniques described herein, although alternatives are possible. The particular media pack configuration depicted is generally cylindrical, however alternative shapes are possible, including ones having non-circular cross-sections and/or ones that taper downwardly in cross-sectional dimension in extension between the ends 3, 4 (or 4, 3).

Herein, the term "media pack" is meant to refer to a media construction in the filter cartridge. The term "media pack" includes the media definition and may include additional material or structure; for example, the media pack may include an inner liner or an outer liner, or both, as discussed below.

The techniques described are particularly advantageous when applied in circumstances in which the media pack 2, or at least a portion thereof, is pleated, i.e. includes pleated media. However, the techniques can be applied in alternate applications.

The particular filter cartridge 2 depicted, is configured for use with "out-to-in" flow during filtering. By this it is meant that the carrier fluid (i.e., typically gas or air) being filtered is filtered as the carrier fluid passes from an exterior perimeter 2x of the media pack 2 to an interior perimeter 2i during filtering. The techniques can, however, be applied when the cartridge 1 is configured for an alternate direction of flow during filtering.

The cartridge 1 depicted is configured with the media pack 2 extending between first and second end pieces 8, 9. The first end piece 8 is positioned on the first end 3 of the media pack 2, and generally comprises an "open end piece;" i.e., the end piece 8 has a central opening 10 therein, through which the fluid (typically gas or air) passes during use. For the particular "out-to-in flow" assembly depicted, the central aperture 10 is an outlet aperture for filtered fluid (typically gas or air) to leave cartridge interior 5.

In a typical application, with the media surrounding an open interior, the second end piece 9 is positioned on the second end 4 of media pack 2, and is closed to passage of fluid (typically air or gas) therethrough; i.e., it is a closed end piece. The techniques described herein can be applied in different applications, however, for example in which the end piece 9 is open or is closed by additional structure.

Still referring to FIG. 1, the particular cartridge 1 depicted includes a media pack 2 that includes an optional inner media support or liner 12 around which media 2m, in the media pack 2, is positioned. The optional inner media support 12 provides a variety of functions including: support of the media 2m against collapse, radially inwardly, due to air or gas pressure against exterior 2x during filtering; retention of the media 2m in a desired configuration during manufacturing and assembly; and, provision of axial strength to the cartridge 2 in a direction of extension between media pack ends 3, 4 (i.e. in the direction of axis X) during manufacture, assembly and use.

A variety of materials for the optional liner 12 can be used. The example liner 12 depicted, comprises an expanded metal liner. However, alternatively, a perforated metal tube can be used, and/or various plastic liner constructions can be used. In some instances, the cartridge 1 can be provided with a media pack that does not include an inner liner, although use of an inner liner will be typical. In some instances, when an inner liner is not provided in the cartridge, support to the media 2m can be provided by a liner construction already positioned in the housing, when the cartridge 1 is installed. For example, it can be provided by a support structure that comprises a portion of the housing, or by support structure that comprises a portion of an internally positioned secondary or safety filter or other arrangement.

The cartridge 1 depicted, is shown with the media pack 2 and media 2m depicted schematically, i.e. individual surface detail and contours are not shown. Further, it is not indicated whether or not the media 2m, or media pack 2, includes an outer liner surrounding the media. In some applications, with out-to-in flow, such an outer liner will not be used. However, the techniques described herein can be applied in cartridges in which an outer liner is provided. The outer liner, when used, can comprise expanded metal, perforated metal, or plastic constructions, for example. Typically, when the media 2m is pleated, analogously to the inner liner, the outer liner will extend adjacent outer pleat tips.

A variety of media configurations can be used, including pleated media configurations. The media can be provided with pleat tip folding to support media pleat spacing, for example as widely used in air filtering and, for example, as can be found in media packs provided under the mark "PleatLoc" from Donaldson Company, Inc, of Bloomington, Minn., the owner of the present disclosure. The media 2m can be provided with beads of adhesive extending along one or both of inner pleat tips and outer pleat tips, to facilitate pleat spacing, also in accord with typical widely used techniques.

Still referring to FIG. 1, the cartridge 1 includes, thereon, a housing seal arrangement 15. The housing seal arrangement 15 includes a (housing seal) resilient and typically compressible member 16, positioned for releasable engagement with a portion of a filter assembly upon operable installation of the cartridge 1 for use. By "resilient" and "releasable sealing engagement" together, and variants thereof in this context, it is meant that the housing seal member 16 comprises an appropriately resilient material that will form a seal in engagement with a housing component, when the cartridge 1 is installed, and will release from sealing engagement, when the cartridge 1 is removed from interaction with the engaged housing component. Typically, the resilient material chosen will be a compressible material, i.e., a material that can compress in dimension as it is pushed in place. The releasable sealing engagement typically will be of a type that can be engaged/disengaged under hand (installation or removal) forces provided by a service provider. Further, typically the releasable seal engagement will be "clampless" or "clamp-free", i.e. will be engaged and disengaged without the use of a clamp or other structure that needs to be tightened or adjusted in place.

The particular (seal) resilient member 16 depicted, is configured to form a radial seal (or radially directed seal) with a housing component in use. The term "radial seal" and variants thereof in this context is meant to refer to a seal that is established with sealing forces directed generally toward or away from a central axis X, surrounded by the seal member 16. In this instance, the central axis X also corresponds to the central axis X for the cartridge 1, around which the media 2 is positioned, and further corresponds to a central axis X for the aperture 10.

The particular housing seal member 16 depicted is configured for forming a "radially inwardly directed" seal, upon engagement with a housing component, i.e., a seal that engages with the seal member surrounding the housing component. While this will be typical for many of the applications according to the present disclosure, the techniques described can be applied when the seal arrangement 16 is configured to form an outwardly directed seal with a housing component in use, i.e., a seal that engages with a housing component by the seal member being surrounded by the housing component.

The particular housing seal member 16 depicted, generally defines a circular pattern around central axis X. While this will be typical for many applications, alternatives are possible. Alternatives can include, for example, an oval seal shape or still further alternate geometric configurations.

A variety of materials can be used for the seal member 16. Typically, the seal member will be formed from a relatively soft (by comparison to a remainder of the end cap 8), compressible, member such as a foamed polymer that compresses/deflects upon engagement with a housing structure. Typical housing seal members 16 will be formed from a tpe (thermoplastic elastomer) material providing an "as molded" density of no greater than 28 lbs./cu. ft. (0.32 g/cc) and often no greater than 15 lbs./cu.ft. (0.24 g/cc), for example 10 lbs./cu.ft.-15 lbs./cu. ft. (0.16 g/cc-0.24 g/cc) and/or which has a hardness, Shore A, of no greater than 20, typically no greater than 18 and often within the range of 10-18, inclusive. For example, useable materials include foamed polyurethanes such as those described in U.S. Pat. No. 8,226,786, incorporated herein by reference, although alternatives are possible.

A typical housing seal arrangement 16 comprises a molded member that is preformed before being incorporated into the cartridge 1, and which, upon incorporation, cannot be readily removed from the cartridge 1 without damage to either the seal member 16 or other portions of the cartridge 1. Alternately stated, the typical housing seal member 16 is a preformed member (or preform) secured to the remainder of the cartridge 1 in a non-removable manner. Thus, when the cartridge 1 is removed and replaced, so is the seal member 16.

Because the seal member 16 is typically formed from a compressible/resilient material, it is typically desired to provide the seal arrangement 10 with a (radial) seal support. Cartridge 1 includes such a seal support, as indicated at 20. The seal support 20 is a relatively rigid (by comparison to the seal member 16) construction that provides structural, radial, support to the radial seal member 16, to ensure integrity of the seal member 16 and to provide structure against which the seal member 16 is radially compressed when the seal member is radially engaged with a housing seal arrangement. Alternately stated, when the cartridge 1 is installed, the seal member 16 becomes radially compressed between the housing member against which it seals and the seal support. Since the seal arrangement 15 depicted is a radially inwardly directed seal, the seal support 20 is positioned surrounding the seal member 16. (If the seal member 16 were configured to form a radially outwardly directed seal, the seal support would comprise structure surrounded by the seal member.) As will be understood from further description below, the particular seal support 20 depicted, preferably comprises a structure that also cannot be removed from the cartridge 1, once positioned thereon, without damage to the seal support and/or a remainder of the cartridge. Further, for the example depicted, the seal support 20 comprises an integral portion or section of end cap or end piece, along with an end cap section 21, discussed below.

Typically, the only portion that end cap 8 which forms a seal with the housing member, is the seal member 16 configured to form a radially directed seal. That is, preferably, no portion or material on end cap 8 other than seal member 16 is positioned to form a seal of any type with the housing member, when cartridge 1 is installed. Although alternatives are possible, the construction with only one seal member 16 characterized, is preferred.

Although alternatives are possible, typically the seal support is a continuous, solid, member in extension around the central axis X. By "continuous" in this context, it is meant that preferably the seal support 20 does not have any gaps therein, in portions that support the seal member 16, i.e. portions against which the seal member 16 presses, although gaps can be accommodated. By "solid" in this context, it is meant that preferably the seal member 20 does not have any apertures therethrough, in portions that support the seal member 16, i.e. portions against which the seal member is pressed upon installation, although apertures can be accommodated.

Still referring to FIG. 1, it is noted that the seal support 20, when positioned around the seal member 16 as depicted, provides protection to the seal member 16 against damage during handling and shipping. In general, having a relatively rigid structural member adjacent the seal member 16 facilitates this.

As will be understood from discussion below in connection with FIGS. 3-5, typically, when the cartridge 1 is installed in a filter assembly for use, a first end of the cartridge 1, in which the seal arrangement 15 is positioned, is pressed against an end wall of the housing. It is preferable that this engagement have resiliency, for stable support of the cartridge 1 during equipment operation, such as under circumstances inducing vibration, temperature fluctuation and/or shock. To provide for this, the cartridge 1 includes an axial cushion arrangement 25 positioned on end piece 8, at a location further axially remote from media end 4, and end piece 9 and/or media pack end 3 than any portion of end piece 8. The example cushion arrangement 25 depicted is integral with a resilient, compressible member that forms the seal member 16, and comprises the same material. The particular cushion arrangement 25 depicted, projects axially beyond an end 20x of seal support 20, and comprises a plurality of spaced projections 25p, separated by recess 25r, although alternative shapes are possible. The particular configuration for the cushion arrangement 25 depicted, is discussed further below.

Figure 2:
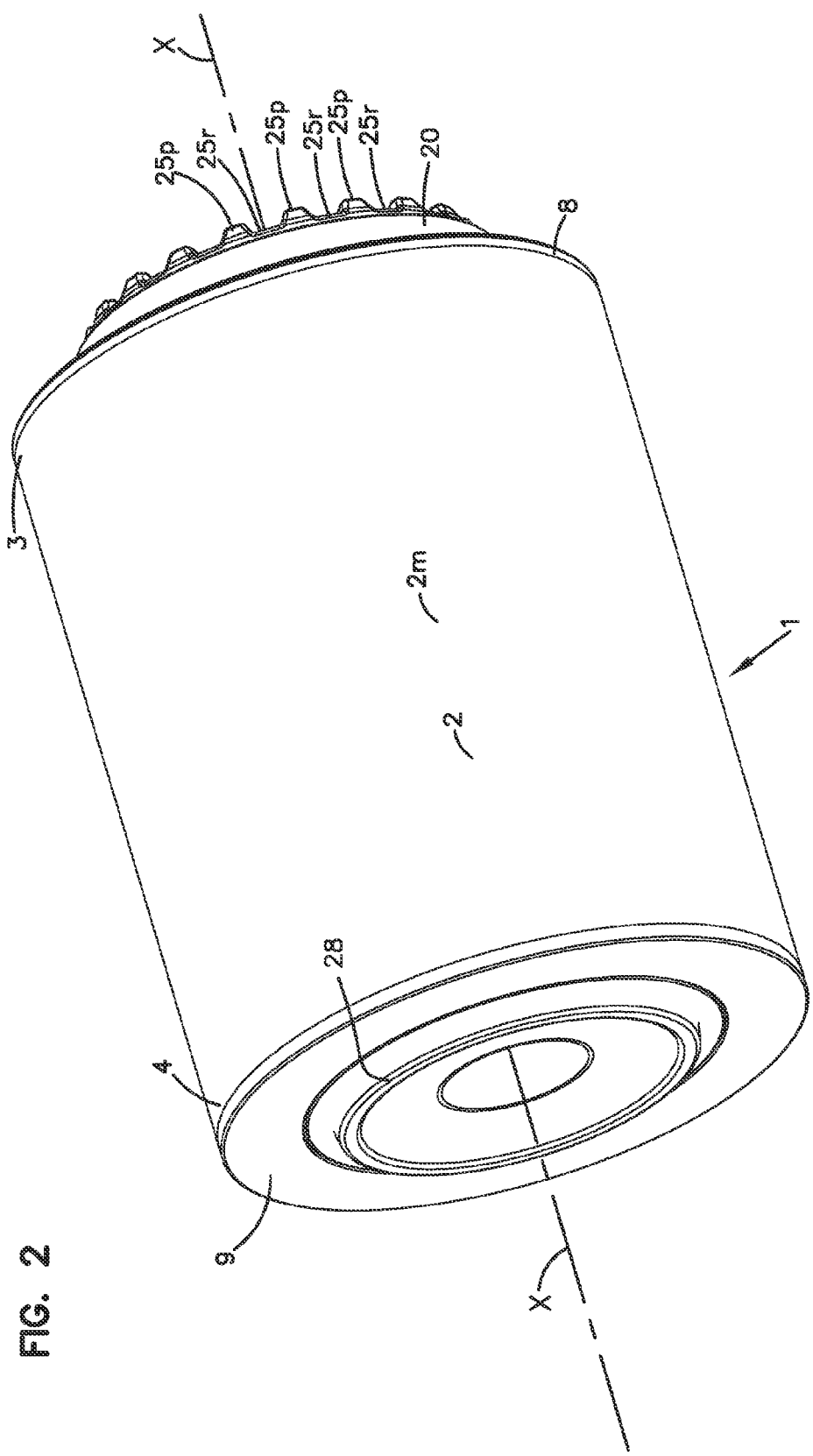
FIG. 2 is a schematic, closed end, perspective view of the filter cartridge depicted in FIG. 1.

In FIG. 2, a perspective view of the cartridge 1 is provided, directed generally toward the end piece 9. Although alternatives are possible, the end piece 9 can be seen as comprising a closed end piece in the example depicted; i.e. there is no aperture through end piece 9. The end piece 9 can also be seen as having, projecting axially outwardly therefrom in a direction generally away from end piece 8, an axial projection arrangement 28 configured for engagement with a portion of a housing, during installation of cartridge 1, as discussed below. The projection arrangement 28 depicted, is configured as a continuous ring, although alternatives, such as segmented rings, are possible. The typical, preferred, operation of the projection arrangement 28 is discussed further below in connection with other Figures. In general, the projection engagement 28 can comprise either a relatively hard rigid material (by comparison to cushion member 25 and seal member 16) or a soft compressible material (by comparison to support 20). It is generally configured to engage an end of a housing opposite cushion arrangement 25, upon installation of the cartridge 1, for cartridge support.

Figure 3:
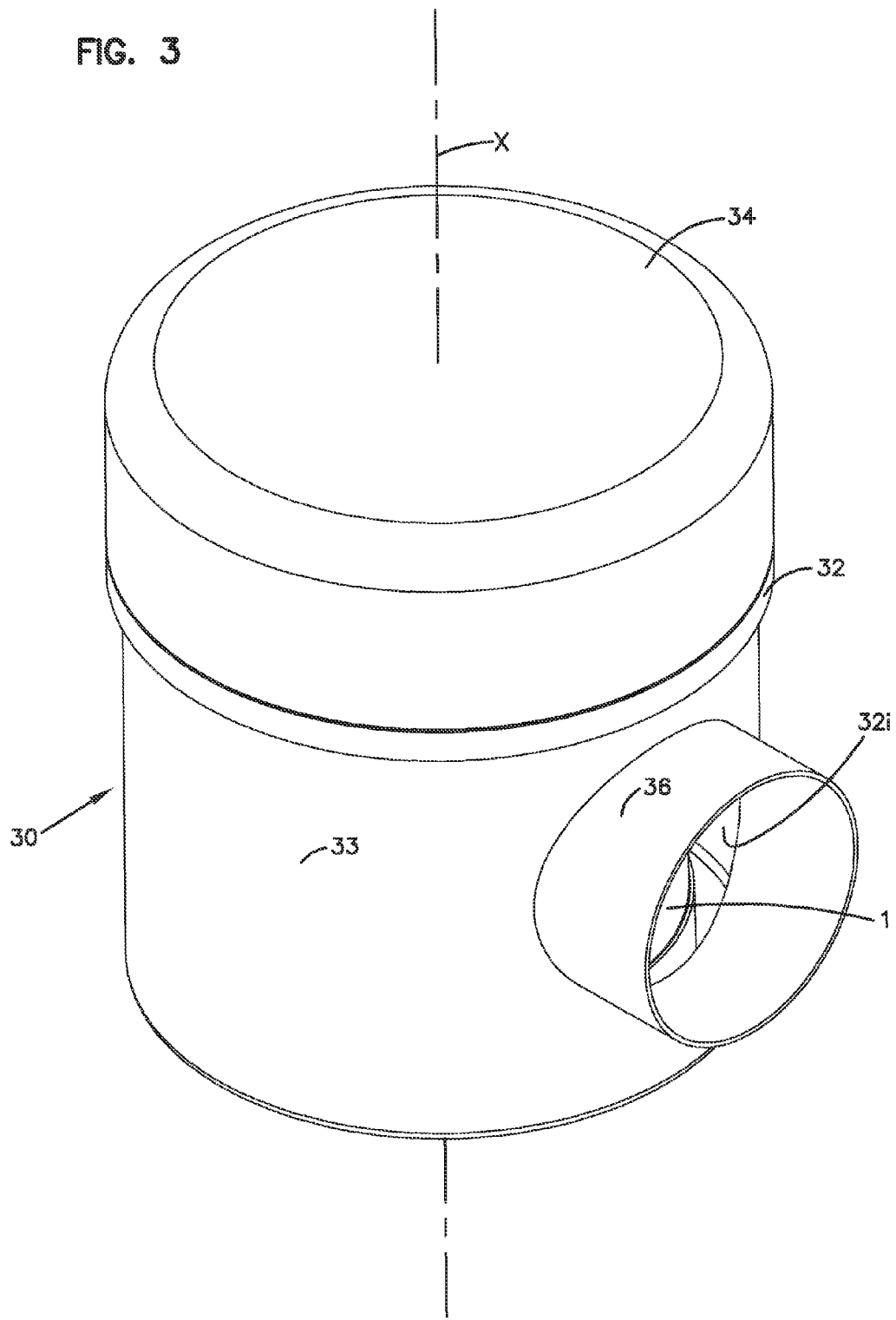
FIG. 3 is a schematic perspective view of a filter assembly including a filter cartridge according to the present disclosure removably positioned therein.

Attention is now directed to FIG. 3. In FIG. 3, a schematic perspective view of an air cleaner assembly 30 including a filter cartridge therein in accord with filter cartridge 1 is depicted. FIG. 3 should be understood to be schematic, and a variety of specific housing features can be used with principles according to the present disclosure. For example, housing features as described in U.S. Pat. No. 6,312,491; U.S. Pat. No. 7,455,707; U.S. Pat. No. 6,139,607; U.S. Pat. No. 7,981,187; WO 89/01818; WO 2012/116314; WO 2006/026241; WO 2006/119414; WO 2009/014982; WO 2009/014986; WO 2009/014988, incorporated herein by reference, can be used. The filter assembly 30 depicted would typically be configured as an air cleaner assembly, but, as referenced above, alternative applications are possible.

Referring to FIG. 3, the filter assembly 30 comprises a housing 32 having a housing body portion 33 and an access cover 34. The access cover 34 is removably positioned on the body portion 33, for service access to an interior 32i of the housing 32. In general terms, upon removal of the access cover 34, an interiorly received cartridge 1 can be removed, and/or a cartridge 1 can be installed.

Still referring to FIG. 3, at 36, a gas flow tube is provided, allowing for flow access to interior 32i. The particular flow tube 36 depicted is a gas (air) flow inlet since the filter assembly 30 is configured for "out-to-in" flow through to cartridge 1 during filtering. Of course, in selected alternate applications, the flow tube 36 could be an outlet flow tube for filtered air.

Figure 4:
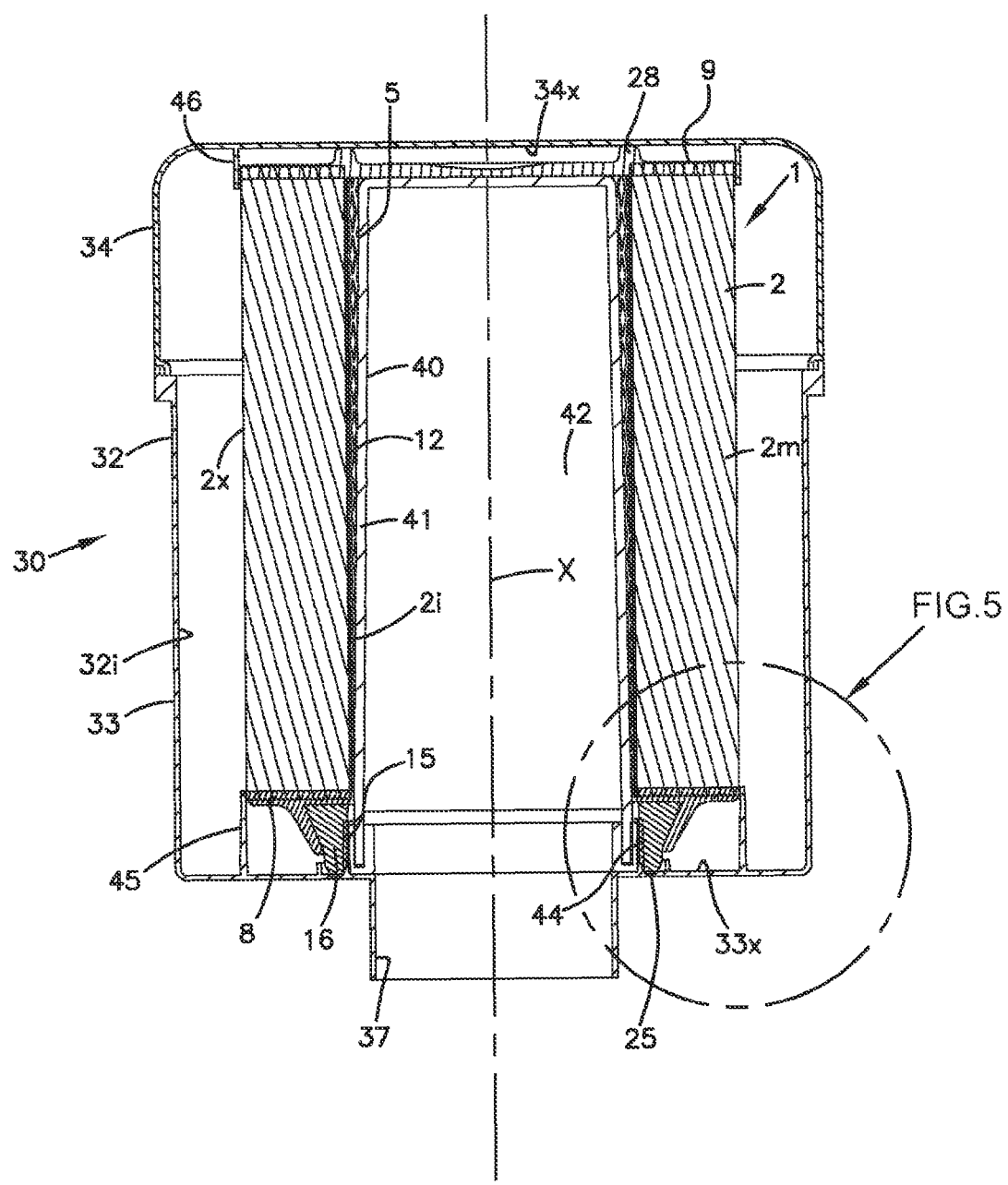
FIG. 4 is a schematic cross-sectional view of the filter assembly of FIG. 3.

Attention is now directed to FIG. 4, schematic cross-sectional view of the filter assembly 30. Here, cartridge 1 can be seen installed with interior 32i of housing 32. The housing 32 seen as including a second flow tube 37. For the particular assembly depicted, flow tube 37 is an outlet flow tube for filtered gas (air), but alternate constructions are possible, for example with the flow during filtering being through tube 37 into an interior 2i surrounded by the cartridge 1, through the media 2, and then outwardly through flow tube 36, FIG. 3.

Still referring to FIG. 4, the particular filter assembly 30 depicted, is shown including a serviceable safety or secondary filter cartridge 40 positioned therein. The safety or filter cartridge 40 is positioned with media 41 thereof positioned in an interior 5 of cartridge 1 at a location surrounded by the media pack 2. As gases flow through the media pack 2 from exterior 2x to interior 2i, they are filtered. The gases are then passed through the safety cartridge media 41 into open central interior 42 (and a portion of cartridge interior 5 of the main cartridge 1). These gases can then pass outwardly through tube 37. The optional safety cartridge 40 may be constructed in a variety of configurations, now known or later developed.

In FIG. 4, the cartridge 1 can be seen positioned in extension between an end 34x of the access cover 34, and an end 33x of the housing body portion 33. In the particular arrangement depicted, the cartridge 1 is configured with a central axis X thereof extending vertically, and with end piece 8 directed downwardly. However, alternative orientations are possible with principles according to the present disclosure, including, for example, horizontal ones and inverted ones.

In FIG. 4, one can see that the cartridge 1 is stabilized axially, i.e., against undesired movement in the direction of axis X, by engagement between projection arrangement 28 with end 34x, and cushion arrangement 25 with end 33x. The cushion arrangement 25 provides that there is some cushion in this engagement, to help stabilize the cartridge 1 under vibration, shock, etc. Also, providing a cushion to the engagement helps ensure that manufacturing variation is accommodated and variations from temperature fluctuations are managed.

Typically, a latch arrangement (not shown) or other connection arrangement is provided between access cover 34 and housing body 33. Typically, the connection arrangement is configured to help ensure that the cartridge 1 is secured in place under axial compression between ends 33x and 34x.

Still referring to FIG. 4, it is preferable that the cartridge 1 not form an axial seal with end 33x of the cartridge, i.e., a seal under compression in the direction of axis X. Reasons for this include that the housing 32 is often not constructed to preserve and secure such a seal. In addition, there may be housing structure, for example, strengthening ribs or other structures, at end 33x in the region where it is engaged by cushion arrangement 25. The particular cushion arrangement 25 depicted, FIG. 1, comprises a plurality of projections 25p separated by recesses 25r and thus does not provide an end edge readily capable of such an undesired axial sealing engagement.

Preferably the projections 25p and recesses 25r are configured and sized, so that even in the recesses 25r, a cushion arrangement 25 that projects axially beyond an end or tip of support 20 is provided. Thus, even if the projections 25p fully compress, cushion material will still be present from regions 25r to help avoid a hard contact between support 20 and the housing body 33.

Referring to FIG. 4, the filter assembly 30 includes a seal flange 44, projecting axially into housing interior 32i, for sealing engagement by the seal member 16. The seal flange 44 depicted comprises a portion of integral with the remainder of housing section 33. However, the seal flange 44 can, for example, comprise a portion of a flow tube or other housing construction that is attached by mounting to a remainder of the housing section 33 as opposed to being formed integral therewith.

Still referring to FIG. 4, the particular seal flange 44 depicted, is configured to be surrounded by seal member 16 during a releasable sealing engagement therewith, resulting in the releasable radially directed (in this inwardly radially directed) housing seal.

In FIG. 4, it can be seen that seal flange 44 is also positioned to be sealed against, along a radially inner surface thereof, by a seal arrangement positioned on an optional safety cartridge 40. Such an engagement of an optional safety is known.

Still referring to FIG. 4, at 45, in housing section 33 is optional structure providing a stabilizing/centering support to an end of cartridge 1 at end piece 8; and, at 46 the access cover 34 is provided with optional stabilizing/centering support surrounding an end of the cartridge 1 at end piece 9. Such stabilizing rings as rings 45, 46 are optional, but can help provide stability and security to positioning of the cartridge 1.

Figure 5:
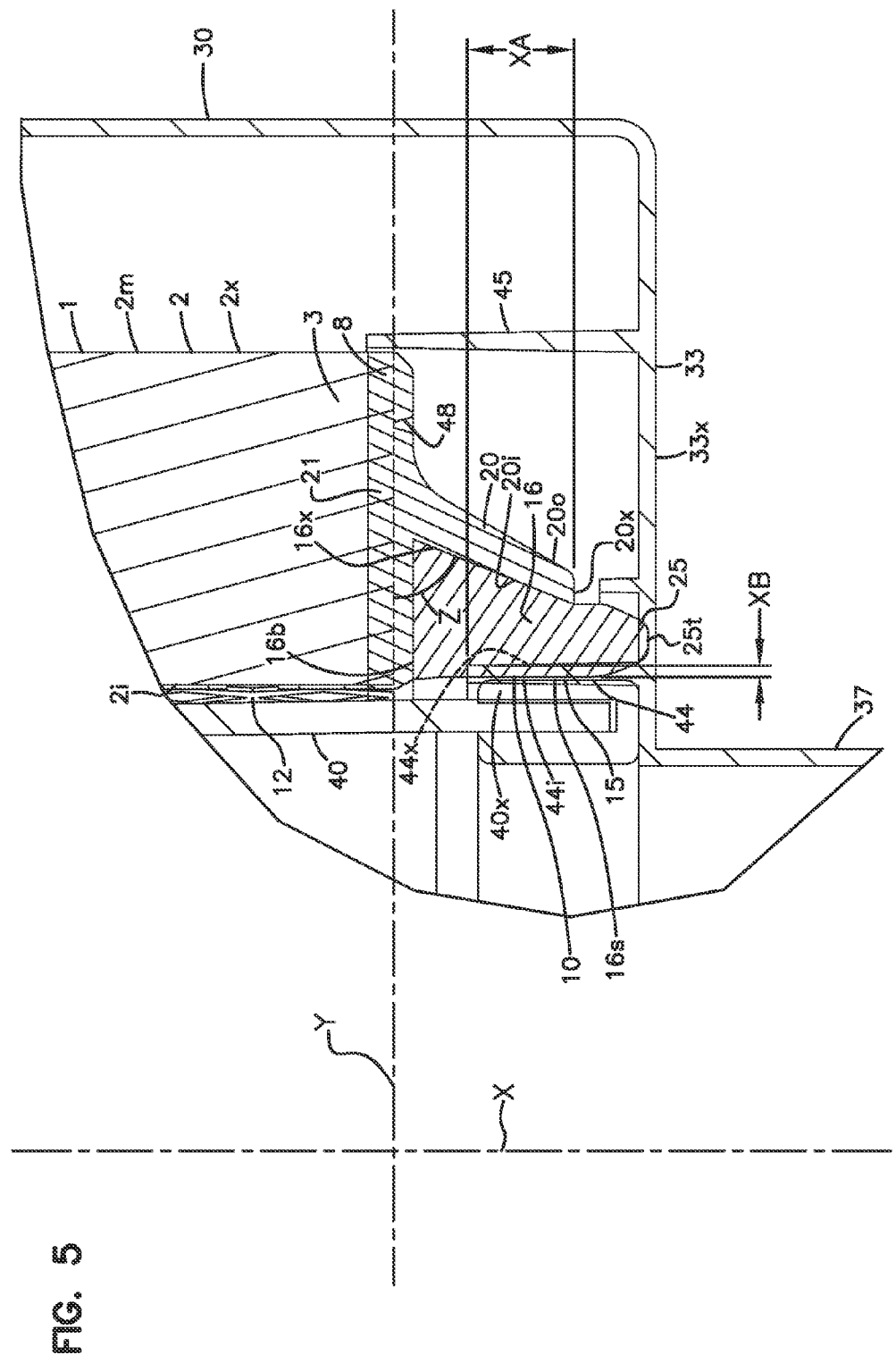
FIG. 5 is an enlarged fragmentary, schematic, cross-sectional view of a portion of the assembly depicted in FIGS. 3 and 4.

Attention is now directed to FIG. 5, an enlarged fragmentary cross-sectional view of a portion of FIG. 4, generally in the vicinity of seal flange 44. The features of the housing 30 viewable and previously discussed, include a portion of housing body 33, end wall 33x, flow tube 37 and support arrangement or ring 45.

Portions of the safety filter or cartridge 40 can also be seen. Seal member 40x can be seen positioned on the safety filter or cartridge 40, in releasable sealing engagement with an inner surface 44i of seal flange 44, as an outwardly radial seal.

Portions of the main cartridge 1, viewable in FIG. 5 and previously discussed, include: media pack 2 having end 3; media pack exterior 2x and interior 2i; inner liner 12; end piece 8; seal member 16; and seal support 20. Cushion arrangement 25 can be seen having a tip 25t projecting into an engagement with end wall 33x. Overlap indicated in the drawings between tip 25t and end wall 33x is meant to indicate an amount of interference or cushion that would typically occur at this location. Similarly, overlap between seal arrangement 16 and flange 44, at an outer surface 44x of flange 44 is meant to show radial interference during normal sealing installation.

Example dimensions provided in FIG. 5 are as follows: XA=16.6 mm; and, XB=1.8 mm. Alternatives can be used.

Still referring to FIG. 5, some particular, preferred, advantageous features of end piece 8, especially related to seal support 20, can be understood. First, the particular end piece 8 depicted can be seen as having two sections: an end cap section 21 and seal support section 20. In the example depicted, the end cap section 21 extends completely across end 3 of the media pack 2 between the media pack interior 2i and the media exterior 2x. Typically, when the media 2 is pleated, the end piece portion 21 has an end portion of the media 2 embedded therein, and thus is molded-in-place and comprises a material that can flow into spaces between pleats to ensure sealing, before complete cure occurs. Typically, end cap section 21 is solid in extension across an end 3 of the media pack 2, i.e. does not include any apertures in overlap with the media 2m, so as to avoid undesired levels of leakage. Of course, the end piece 21 does surround a central air flow aperture 10 discussed above.

Still referring to end piece or end section 21, attention is directed to groove 48. Groove 48 is an artifact from a media standoff in a mold in which end piece 8 would be formed. Such media standoff rings/grooves are typical in many molded-in-place end pieces.

Another feature observable in FIG. 5, is that for a typical preferred application, the support structure 20 is integral with end section 21, i.e., the two are formed integral one another (as integral portions of the same material). Typically, both comprise molded portions of a molded-in-place material, as discussed below.

Still referring to FIG. 5, another feature that can be understood from the Figure with respect to seal support 20 is that generally the seal support 20 defines a sealing engagement surface or wall 20i against which the seal 16 is pressed. The sealing engagement surface or wall 20i is typically a surface that extends, in a direction away from end section 21, generally at an angle that is not parallel to a central axis X of the seal, and thus, is not perpendicular to a plane (that is perpendicular to the central axis X). In FIG. 5, an example plane perpendicular to the central access X is generally indicated at Y. With respect to this definition, for instance, an angle of surface 20i in extension axially away from the media pack 2 or media 2m (or end section 21) is generally indicated at Z. It is typically at least 30°, usually not greater than 85° and often not greater than 80°, more often not greater than 75°. It is also typically at least 40° and often at least 55°. In typical arrangements it will be within the range of 50°-80° inclusive, usually within the range of 55°-75°, inclusive, often 60°-75°. In general, the slanting wall 20i, in coordination with a portion of end section 21, forms a seal member recess 16x in which the seal member 16 is nested or positioned.

It is noted that in the example depicted, the slanting wall 20i (i.e., wall 20) is shown slanting from a location approximately at an intersection with section 21, as it extends axially outwardly away from the media 3. This will be typical. However, in some applications of the techniques described herein, a section of wall 20i (i.e., a support 20) that slants as defined, can be a section that does not intersect end section 21. For example, the portion that slants can be on another portion that extends away from end section 21 perpendicularly to central axis X, that then turns to form the slant. It is preferred that the slanted section 20i (to support 20) be a section in radial overlap within a portion of member 16 that forms to the radial seal, in use, however. This is so that the seal portion 16 is within a recess as defined, and with the radial support provided by support member 20 being provided by a slanted section, to advantage as discussed below.

For the particular example arrangement depicted, the surface or wall 20i slants toward the central axis X as it extends further away from the media pack 2 at end 3. However, if the seal arrangement were configured for a radially outwardly directed seal, an opposite angle of extension, i.e., away from central axis X, would typically be involved. Thus, a slant in the surface 20i is typical, as it extends way from the media pack end 3 and end cap section 21; with the slant being in the general direction of the seal 16 (radially inward or radially outward).

Still referring to FIG. 5, for the particular example depicted, the inner surface 20i of the support 20, which, in this instance, is the seal support surface, is generally smooth and regular. However, while this may be advantageous in many instances, it is not specifically required. That is, the support surface or wall 20i can be irregularly shaped and still provide desired support. When an irregular shape is involved, generally reference to the slant is meant to a general slant or angle, disregarding surface irregularities.

Still referring to FIG. 5, tip 20x of seal support 20 can be seen terminating with portion or cushion section 25 of seal member 16 projecting axially therefrom, in a direction away from the media 3. Typically, the maximum amount of this extension beyond tip 20x by tip 25t is at least 2 mm usually at least 4 mm, typically at least 5 mm, and, usually not more than 20 mm and typically not more than 15 mm, although alternatives are possible.

It is noted that typically even portions 25r of the tip 25t between the various projections 25p, also extend beyond tip 20x of support 20, typically at least 0.5 mm usually at least 1 mm. This is advantageous, as it helps ensure that even if the projections 25p are fully compressed, it is still unlikely that any portion of end 20x will engage the housing, which is advantageous for ensuring that the cartridge 20 is supported without a hard contact engagement between support 20 and a portion of housing, during use.

In a typical assembly, seal member 16 is non-removable from end piece 8, i.e. from engagement with section 21 and support 20. That is, the seal member 16 cannot be separated from these two sections (20, 21) of the end piece 8, without damage to one or the other. This provides for good structural integrity during use. Preferably this non-separable engagement is established upon formation of the end piece 8 by: preforming the seal arrangement 16; and, then, molding the end piece 8 in place, in position engaging both the media pack 2 and seal member 16. Example techniques to accomplish this are described herein below.

Referring still to FIG. 5, and although alternatives are possible, it is noted that, for the example depicted, no portion of the seal member 16 extends along, over or against, a surface 20o, of the support 20, that is opposite surface or wall 20i. This would be typical for preferred applications according to the present disclosure, since support 20 would typically have been molded-in-place, in engagement with a preformed seal member 16.

Figure 6:
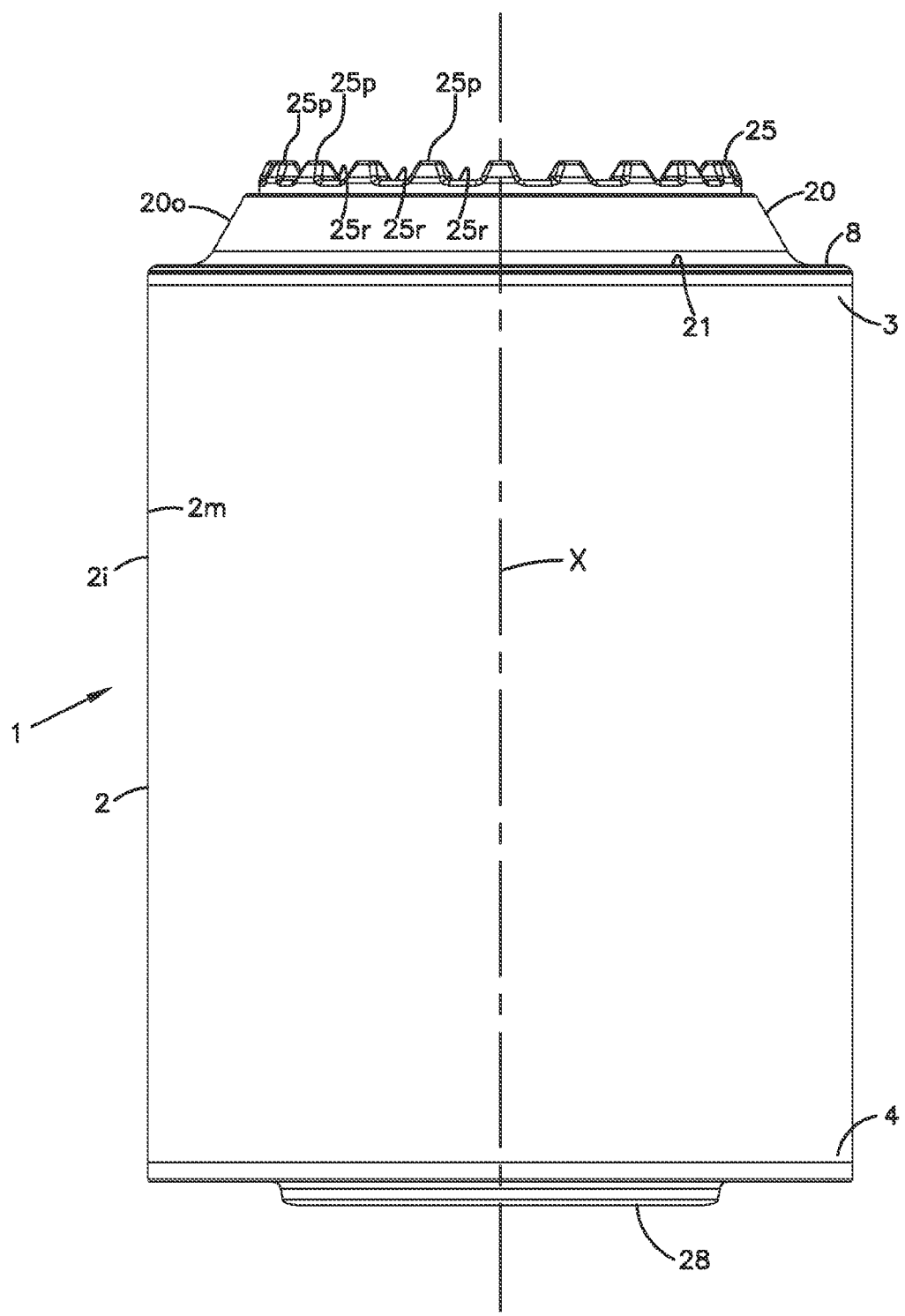
FIG. 6 is a schematic side elevational view of the cartridge depicted in FIGS. 1 and 2.

In FIG. 6, a side elevational view of the cartridge 1 is depicted. It is noted that, as described and depicted, the particular cartridge 1 shown and described is generally radially symmetric, i.e., when viewed from either the left or the right in FIG. 6, or in an opposite direction to that shown in FIG. 6, the cartridge 1 would generally appear the same. Of course, there could be minor differences relating to such features as: media detail; and, precise number and orientation of projections 25p. In general, the cartridge 1 will typically possess overall, general, radial symmetry but for surface detail, although alternatives are possible.

Figure 7:
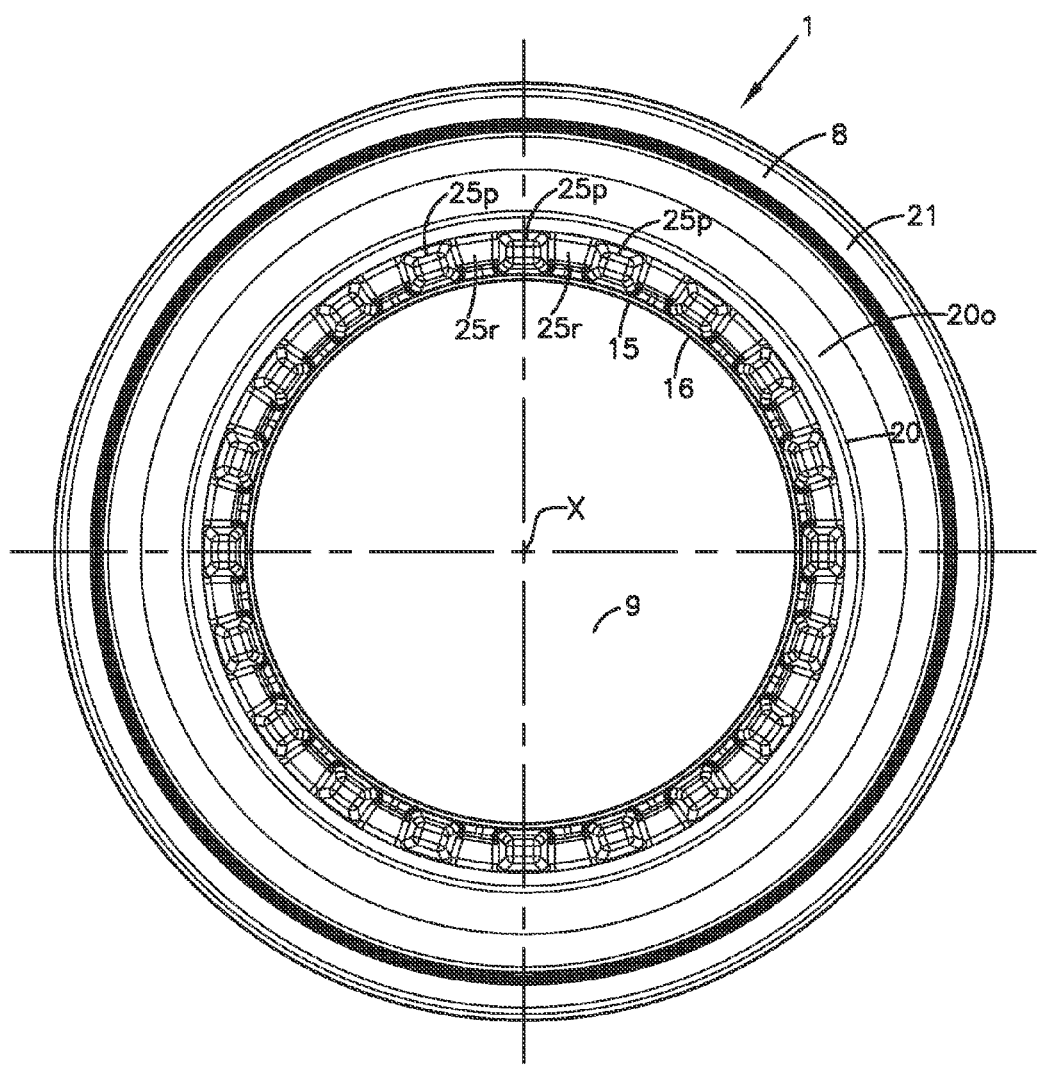
FIG. 7 is a schematic open end view of the filter cartridge depicted in FIGS. 1, 2 and 6.

In FIG. 7, a schematic plan view taken generally toward end piece 8 is provided. It is noted that interior surface features at an opposite end piece 9 of the cartridge from end piece 8 are not depicted in detail in FIG. 7.

Figure 8:
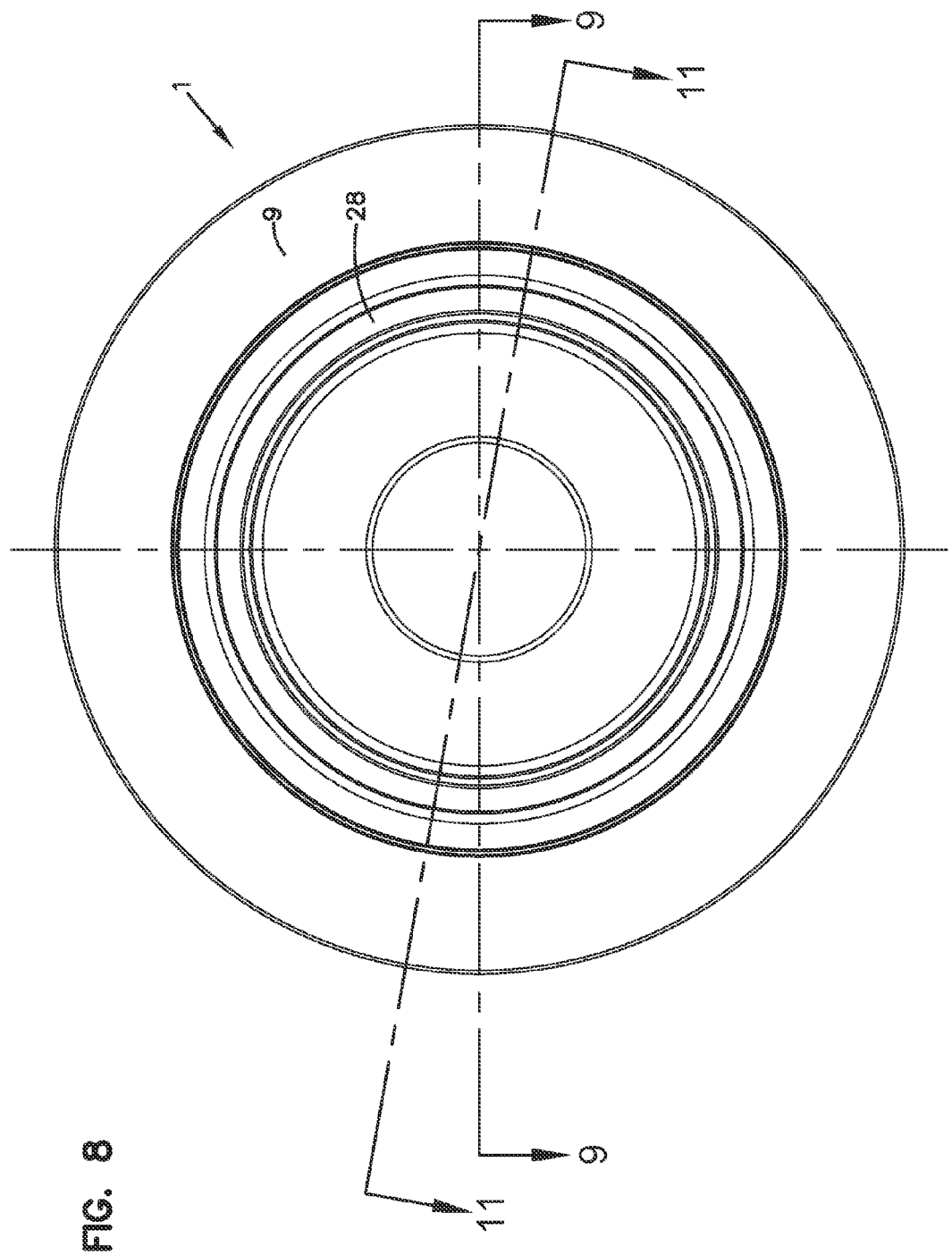
FIG. 8 is a schematic closed end view of the filter cartridge depicted in FIGS. 1, 2, 6 and 7.

In FIG. 8, an end view taken toward closed end piece 9 is depicted. Features previously discussed include the projection 28.

Figure 9:
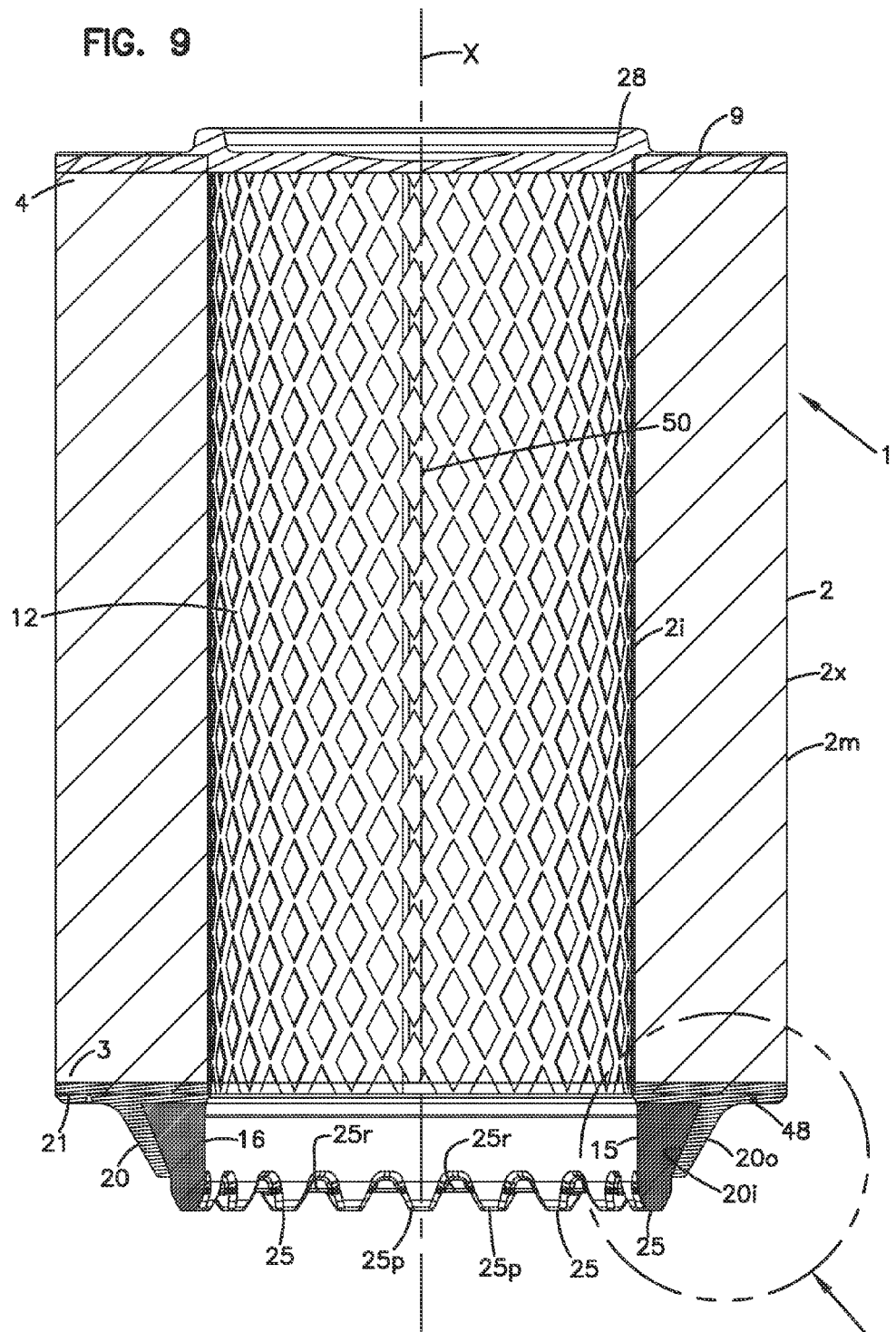
FIG. 9 is a schematic cross-sectional view of the filter cartridge, taken generally along line 9-9, of FIG. 8.

In FIG. 9, a cross-sectional view taken along lines 9-9, FIG. 8 is shown. Here, features previously described include: media pack 2, end piece 9, and end piece 8, support section 20, end cap section 21, seal member 16, cushion section or arrangement 25, and inner liner 12. At 50, a spot welded seam is schematically depicted in an expanded metal inner liner 12.

Figure 10:
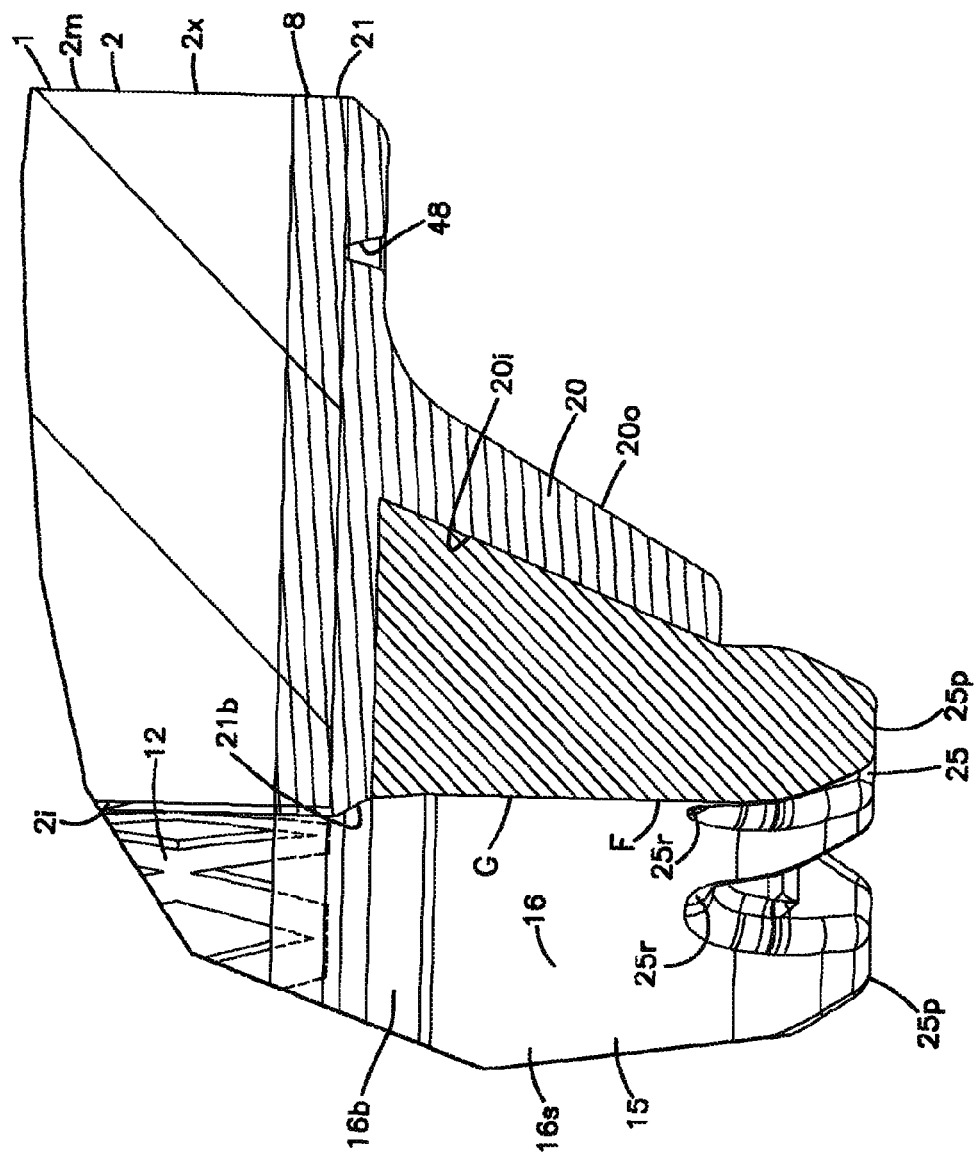
FIG. 10 is an enlarged, fragmentary, schematic view of a selected identified portion of FIG. 9.

In FIG. 10, an enlarged fragmentary view of an identified portion of FIG. 9 is shown. It is noted that inner liner 12 can be seen embedded in a portion of end piece 8, in particular in a portion of end cap portion 21.

Figure 11:
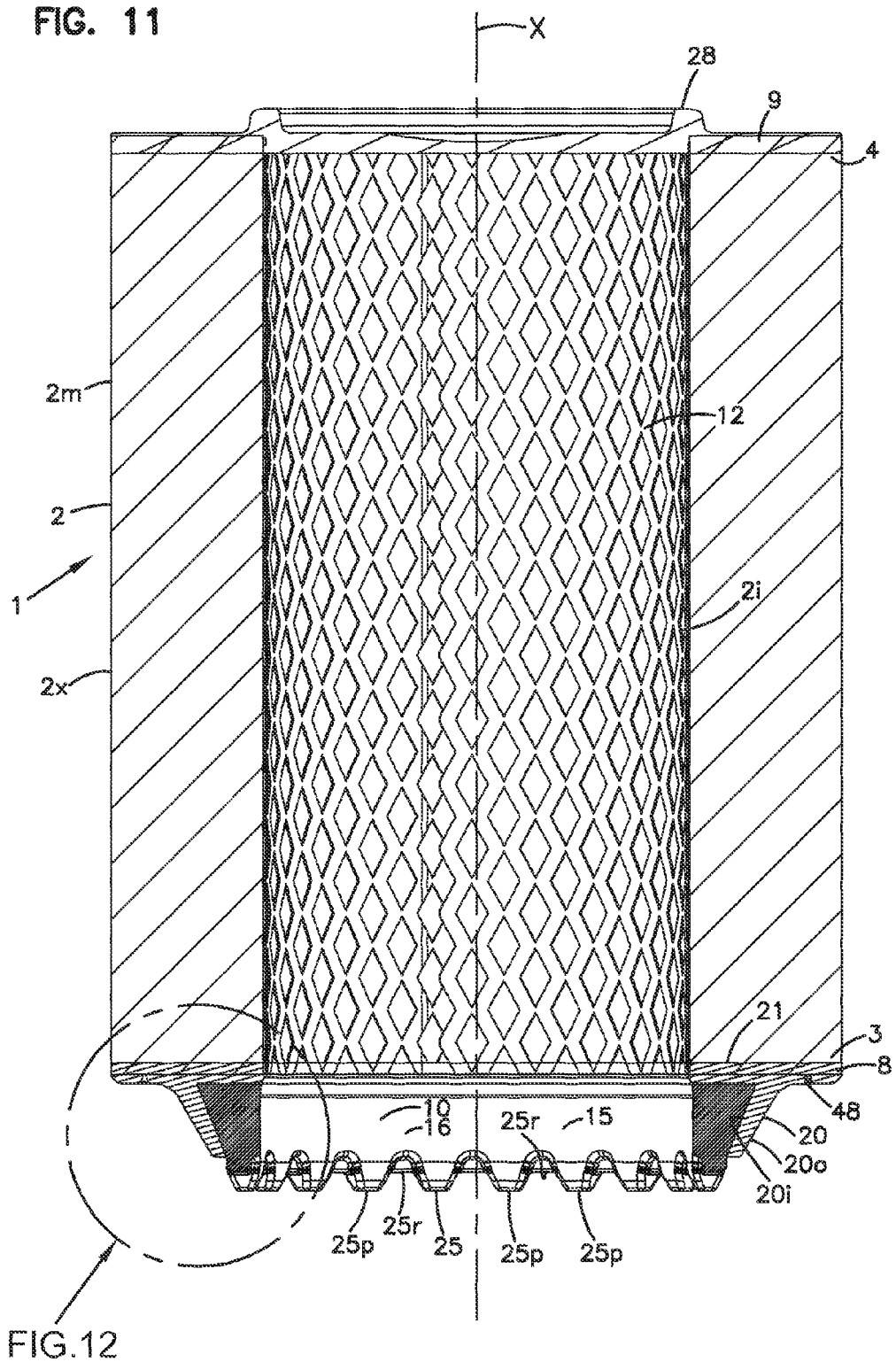
FIG. 11 is a schematic cross-sectional view of a filter cartridge taken generally along line 11-11, of FIG. 8.

In FIG. 11, a second cross sectional view, taken generally along lines 11-11, FIG. 8, is depicted. It is noted that, by comparison to FIG. 9, in FIG. 11 the cross-section is through a recess at 25r, in cushion section 25, whereas in FIG. 9, the cross-section is through projections 25p in cushion section 25. Again, though not necessarily shown in FIG. 12, preferably within recesses 25r at least a portion of member 16 extends axially beyond tip 20t in a direction away from media 2 and section 21. It is not required, however, that all of recess 25r so extend.

Figure 12:
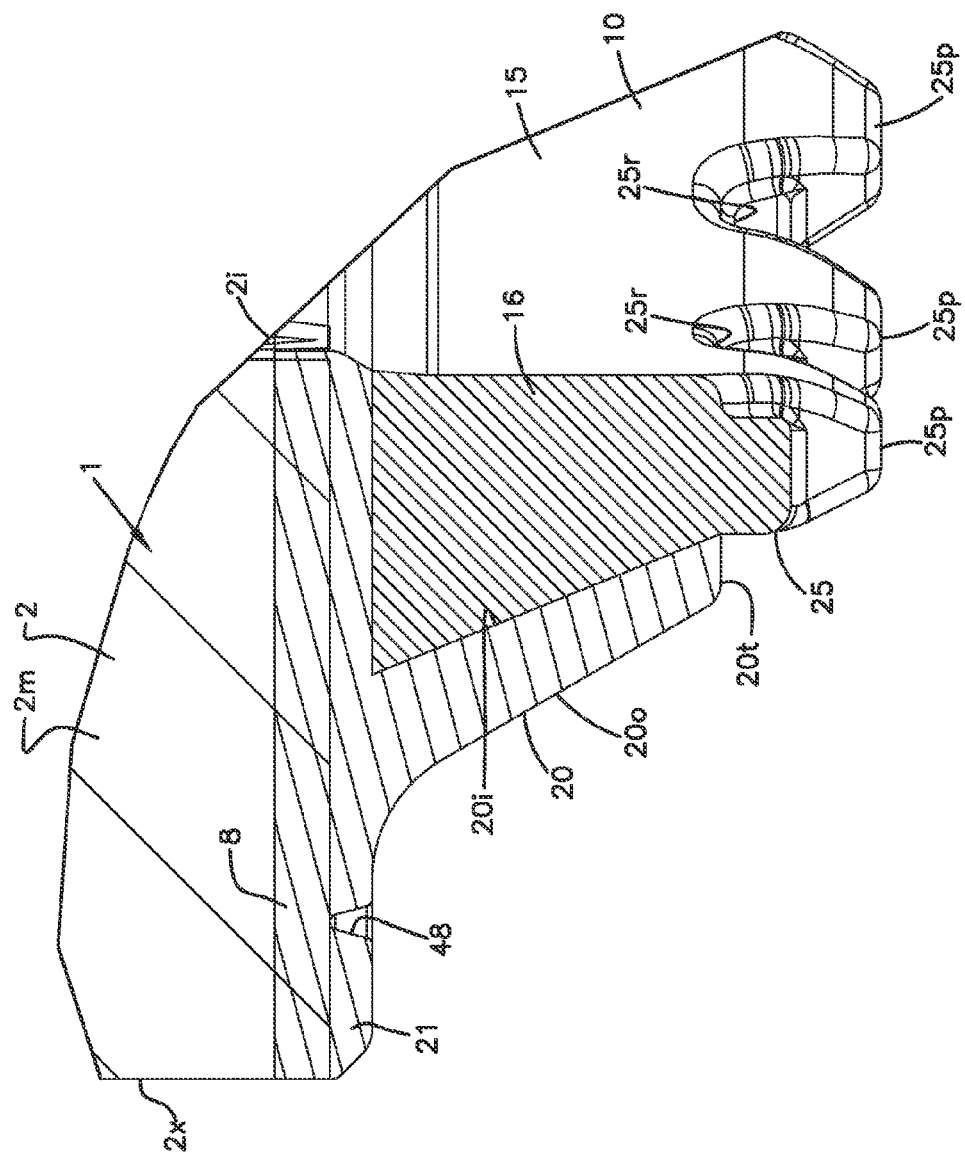
FIG. 12 is an enlarged, schematic, fragmentary view of an identified portion of FIG. 11.

In FIG. 12, an enlarged fragmentary view of an identified portion of FIG. 11 is depicted.

II. An Example Method for Construction of an Arrangement in Accord with FIGS. 1-12; FIGS. 13-17

A variety of methods can be used to construct a filter cartridge 1 in accord with the features discussed and described above in connection with FIGS. 1-12. In FIGS. 13-17, a particularly advantageous and usable construction approach is depicted schematically.

Figure 13:
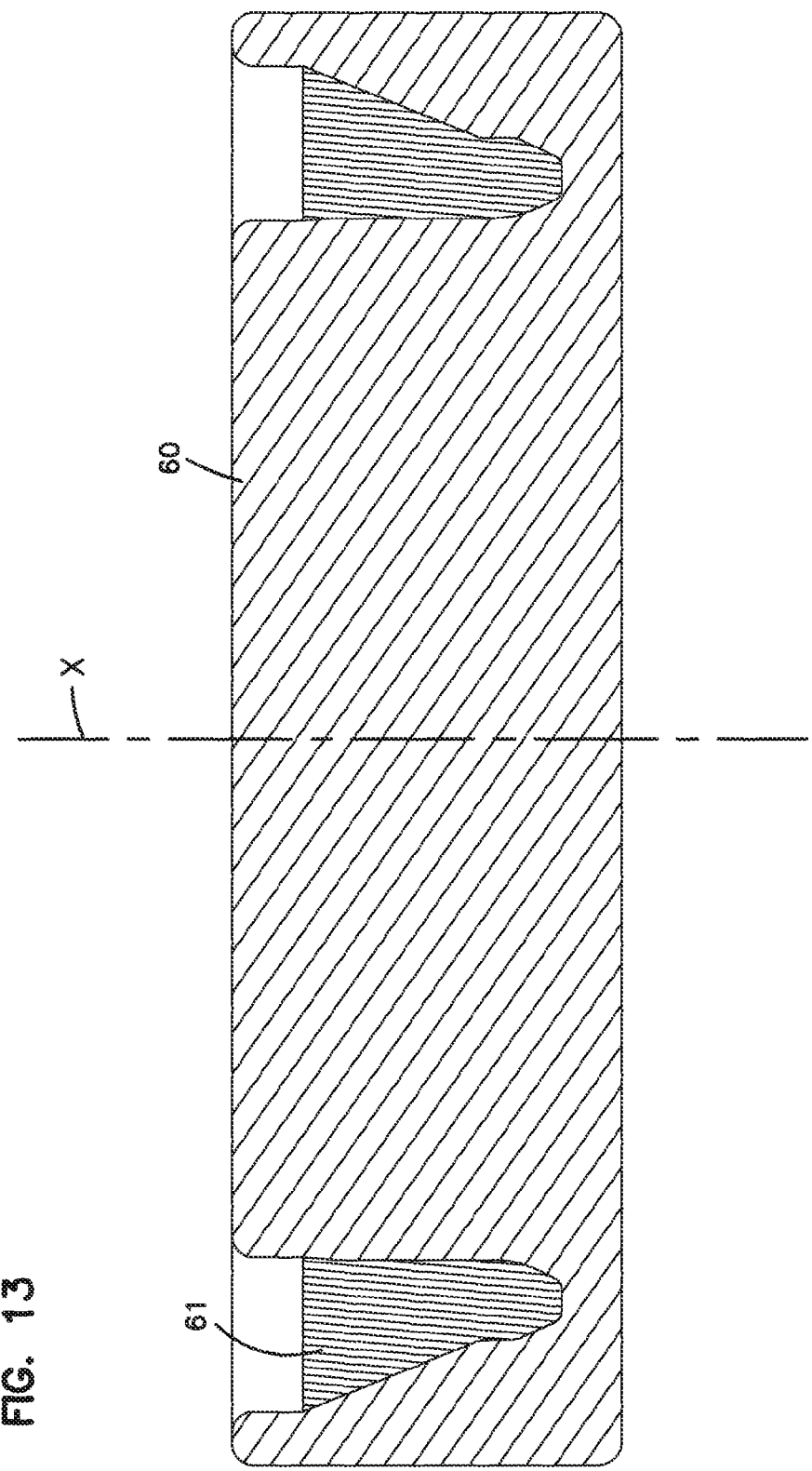
FIG. 13 is a schematic cross-sectional view of a step of forming a seal member in accord with a process for constructing the cartridge of FIG. 1.
Figure 14:
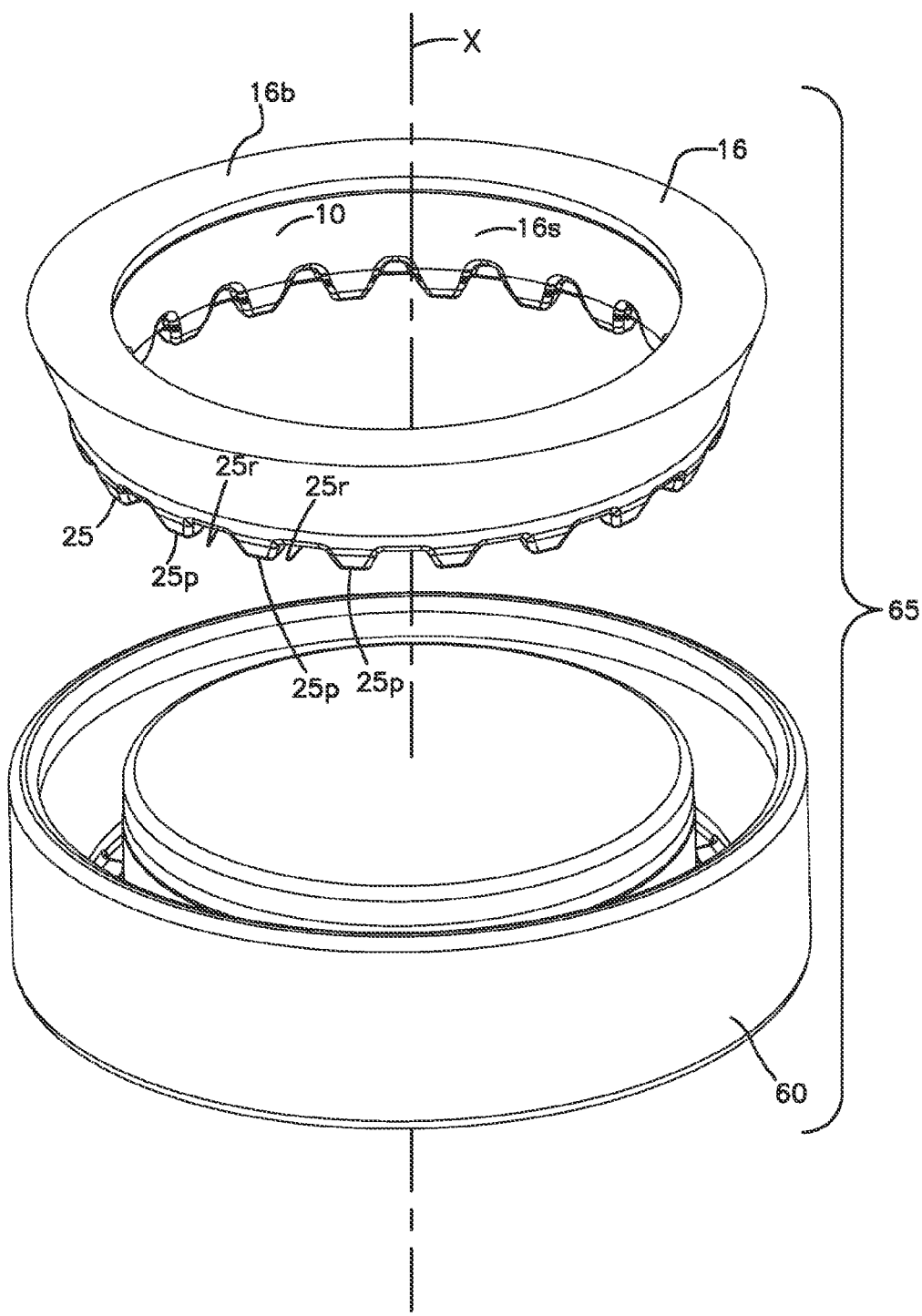
FIG. 14 is a schematic perspective view depicting a step of removing a molded seal member, as a preform, from the mold depicted in FIG. 13.

As discussed previously, in a typical application of preferred principles according to the present disclosure, the cartridge 1 will be made in a process that involves preforming the seal arrangement 16 before it is positioned on the cartridge 1 (and in engagement with the end piece 8). In FIGS. 13 and 14, a process for forming (i.e., preforming) such a seal arrangement is depicted schematically.

Referring to FIG. 13, a schematic cross-sectional view is provided of a mold or mold arrangement 60 having a resin arrangement 61 positioned therein. The resin arrangement 61 comprises a resin from which the seal 16 would be formed. The process depicted in FIG. 13 is an "open mold" process, in which the seal member 16 is formed from a resin 61 poured into an open mold and then allowed to cure. It is to be understood, however, that the processes described can be applied in a closed mold process. Thus, the seal member 16 can be formed from a free rise process or it can be formed from an alternate process, such as, for example, an injection mold process or through other techniques.

Typically, the seal member 16 will be formed from a resin that increases substantially in volume, during cure, for example at least 50% usually at least 60%, often 70% or more, in many instances at least 80%. Typically, the seal member 16 will be molded from a foamed polymer, such as a foamed polyurethane. Example useable materials are those as described above.

An advantage to forming seal member 16 from a resin that increases in volume during cure, which typically forms a foamed component, is that the resulting seal member will be compressable, i.e., it can be compressed as a resilient member between structure when it forms a seal and to conform to a surface against which it seals. Such materials will sometimes be characterized as "soft" since relative to structural supports against to which they are compressed, they are soft materials. Thus, typically and preferably, the seal member 16 previously discussed comprises a portion of a soft, compressible, member that is formed from a foamed resin during cure.

In FIG. 14, a step 65 of removing a molded seal ring 16 from mold 60, after the resin 61 has sufficiently cured (FIG. 13) is shown. Referring to FIG. 14, seal 16 can be seen as having an end 25 comprising projections 25p separated by recesses 25r. Further, the seal 16 can be seen as having a seal surface section 16s configured for engagement with a housing feature, in a releaseably sealing manner. The surface section 16s for the seal 16 depicted, surrounds a central aperture 10 and axis X, because the particular cartridge, for which the depicted seal member 16 is configured, has a radially inwardly directed seal.

Still referring to FIG. 14, seal 16 includes a base end 16b which is an end opposite end 25 that comprises a portion directed toward the media pack end 3, FIG. 5, in the resulting cartridge 1.

Figure 15:
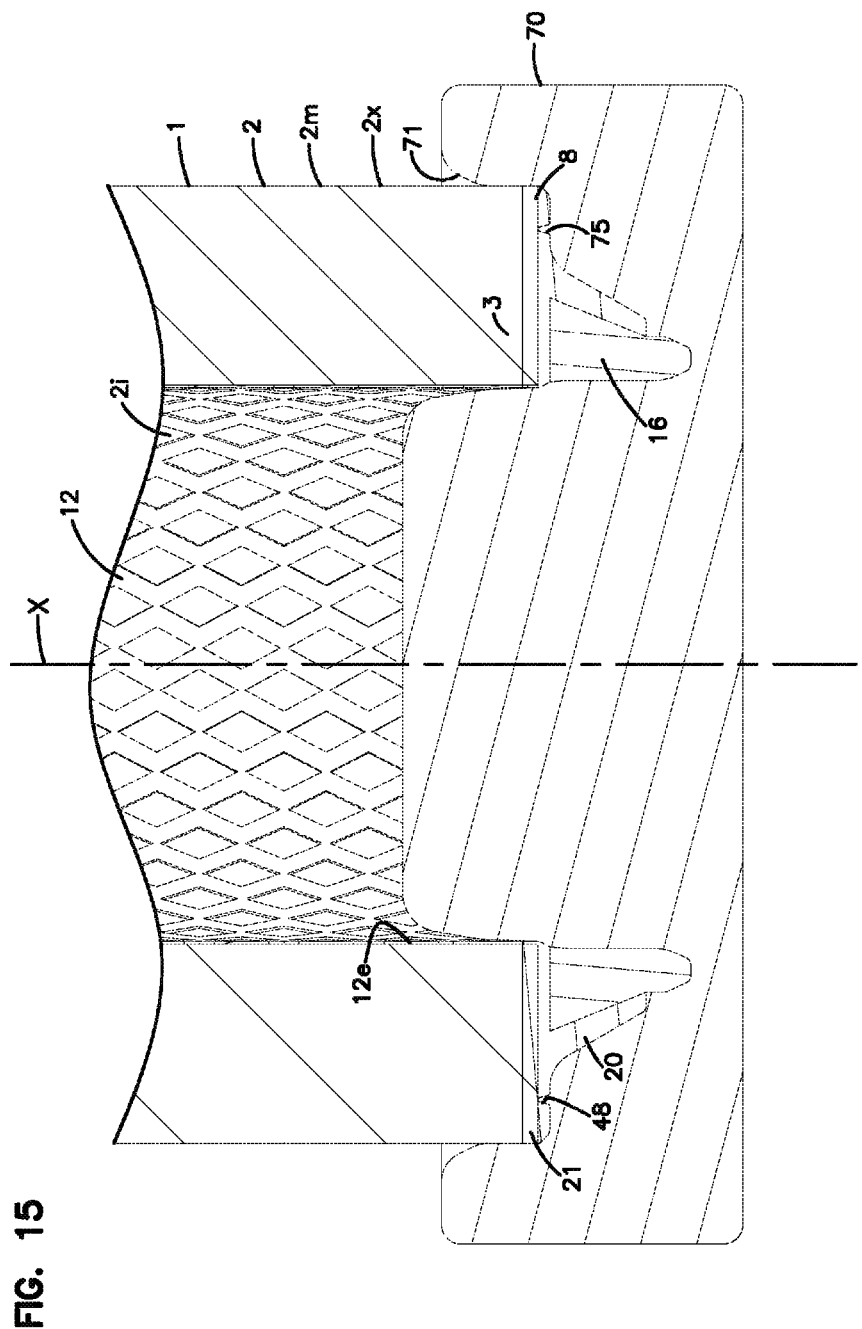
FIG. 15 is a schematic, fragmentary, cross-sectional view of a step of forming a portion of an example filter cartridge including a seal member and an end piece component, in accord with principles of the present disclosure.

In FIG. 15, a step of forming end piece 8 using preformed seal member 16 is shown schematically, and in cross-section. Referring to FIG. 15, a mold 70 is depicted, having a mold cavity 71. Within the mold cavity 71, a preformed seal member 16 is positioned. Typically, after positioning of the preformed seal member 16, a resin will have been poured into the cavity 71, which resin is appropriate for forming end piece 8, i.e. sections 20 and 21. Typically, next, end 3 of the media pack 2, including an end 12e of optional liner 12, will be put into the mold cavity 71, to be engaged by the resin forming end piece 8 during cure. The resin can flow into and engage the media 2m and liner 12, securing the construction together, as sections 20 and 21 are formed. Further, if the resin 8 is chosen from a material that will fully engage and adhere to the seal ring 16 along an interface between the two, the seal ring 16 will be well secured in place, non-removably. Typically, it is desirable to form the seal ring 16 and the molded-in-place portions of the end piece 8 from chemically similar materials, for example both could be formed from urethanes which differ from one another with respect to density, hardness or amount of foam. Typically, end piece 21 will have an as molded density at least 0.08 g/cc greater than the seal 16, usually at least 0.2 g/cc more. When urethane as described above is used for the seal ring 16, it will be particularly convenient to choose a urethane for forming support 20 and end piece 21 which has a density of typically at least 35 lbs./cu.ft (0.4 g/cc) and often at least 40 lbs./cu.ft. (0.46 g/cc), for example 45-55 lbs./cu.ft. (0.51 g/cc-0.63 g/cc) inclusive; and/or, a hardness Shore A of at least 30, typically at least 35 an often at least 40 and usually not more than 75; for example 40-70, inclusive. Typically, such a resin, if it increases in volume during cure at all, increases relatively minimally, i.e., not greater than 30% typically not greater than 20% and often not greater than 15%.

Typically, the order of inserting components and materials into the mold is not critical, except to manage the desire of forming the end piece and support to the media and seal member, securing the two together.

In FIG. 15, a media support 75 is shown, against which the media 2m or media pack 2 rests, during molding of end piece 8. The media support 75 will leave to artifact 48 as discussed above, in the end piece 8. Typically, the media support 75 is sized and configured so at least a thin region of end piece 8 will form thereover, to avoid a formation of a weak point or region.

Still referring to FIG. 15, the process depicted and shown is of an "open mold" curing process. An open mold process will be typical since the media pack 2 (including liner 12) can project outwardly from mold cavity; and, the resin needs to flow into the media end, for example around pleats (if pleated media is used) to ensure good sealing of the end piece in extension across the media 12.

Figure 16:
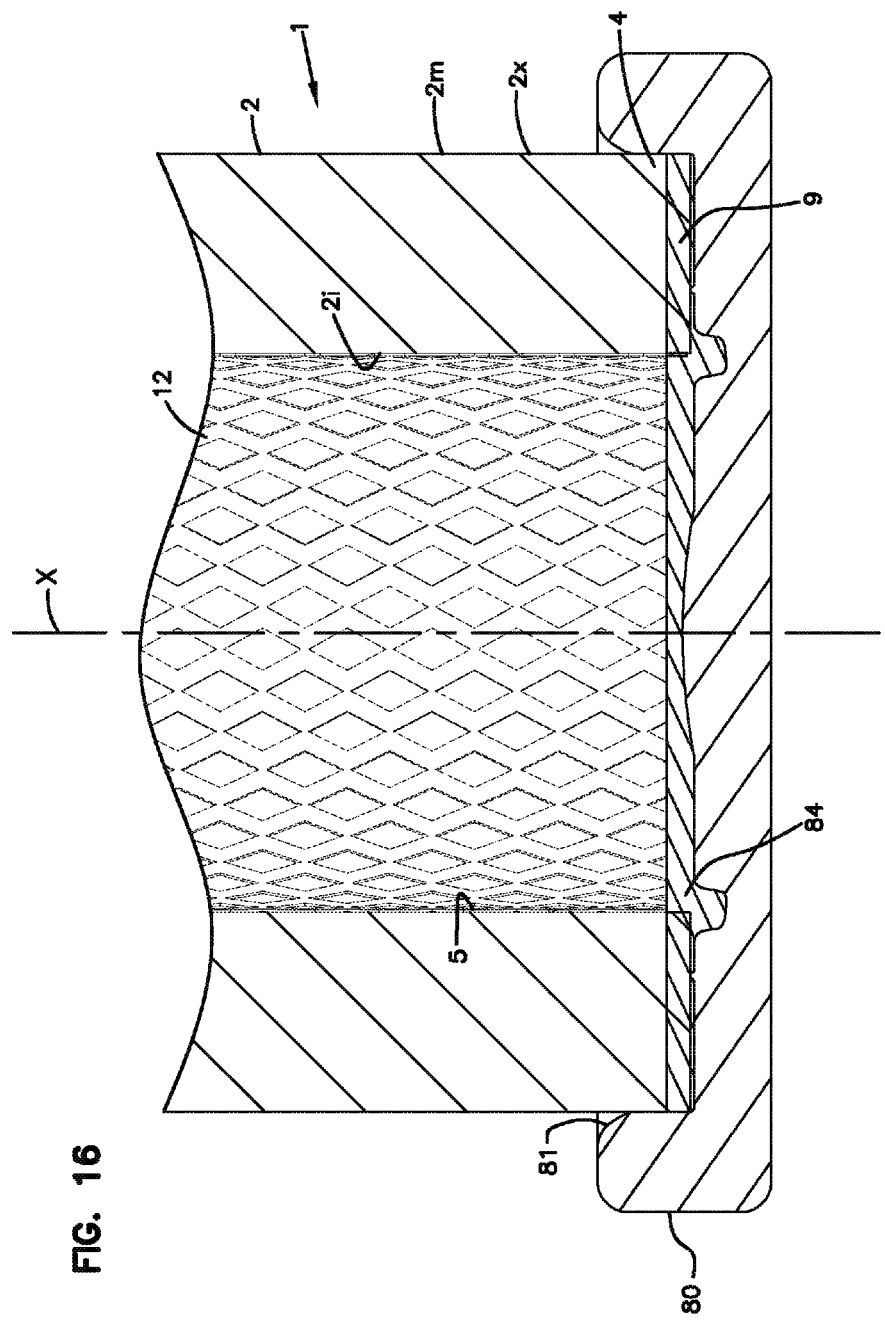
FIG. 16 is a schematic fragmentary cross-sectional view of a step of forming a closed end piece on a filter cartridge in accord with the present disclosure.

In FIG. 16, a schematic depiction, in cross-section, is provided of a step of forming end piece 9. Here, a mold 80 is depicted having a mold cavity 81. Within the cavity 81 is positioned a resin 84 that will cure to form end piece 9. Also positioned within the cavity 81 is an end 4 of the media pack 2 (including an end 12y of the liner 12). When cured, resin 84 will form an end piece 9 secured in place and securing liner 12 and media 2m together in an appropriate manner. It is noted that since the end piece 9 is closed, the resin 84 is distributed within the mold cavity 81 across open interior 5.

The end piece 9 can be constructed of a variety of materials, and can be formed with either a hard (by comparison to the seal member) construction or a soft (by comparison to the seal support) construction as desired. For the particular process depicted in FIG. 16, a material that will form a relatively hard construction, such as a material similar to that used for forming end piece 8, is used. However, a softer material (like seal construction 16) may be preferred for a cushion effect.

It is noted that in FIG. 16, the mold process depicted is an "open mold" process. An open mold process will be typical and preferred, as it allows portions of the media 2m and optional liner 12 to project outwardly from the mold.

Figure 17:
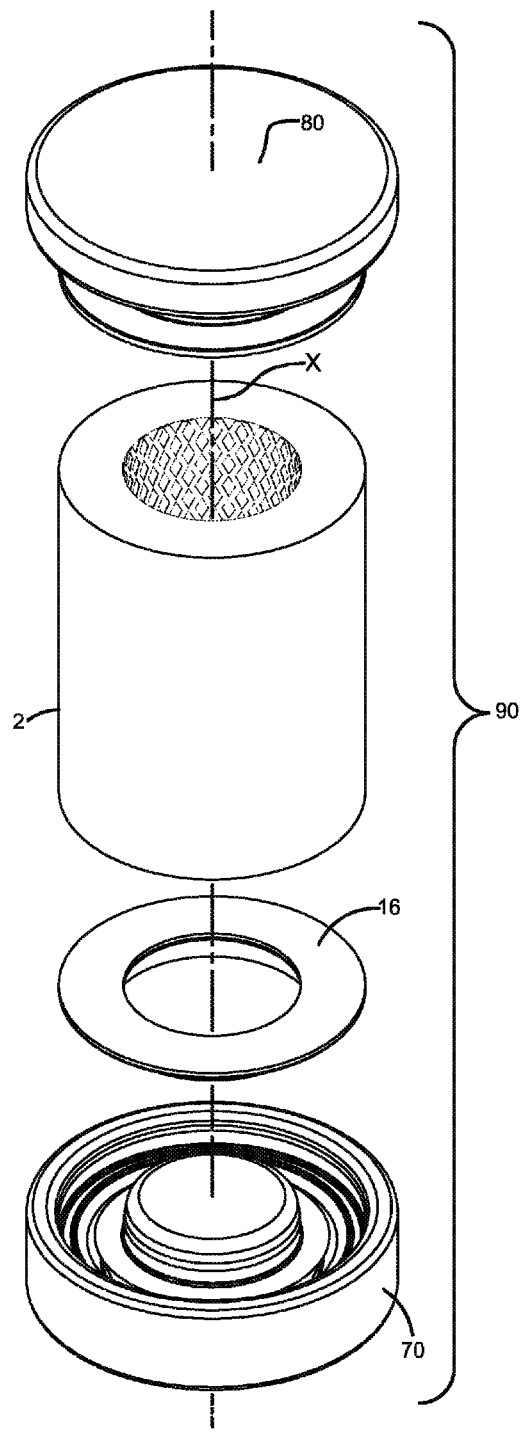
FIG. 17 is a schematic perspective exploded view depicting features concerning structure, components and methods for forming a filter cartridge in accord with the present disclosure.

In FIG. 17, at 90, an exploded view is shown of materials related to construction of a cartridge 1 according to the present disclosure. It is not to be suggested by FIG. 17, that the components would be constructed and used in the orientation shown, merely that these materials are used to construct the cartridge 1.

It is not critical to obtaining a desirable cartridge 1 whether the end piece 8 or the end piece 9 is the first end piece formed. Various orders can be used in a process according to the present disclosure.

III. Selected Alternative Constructions; Features

Figure 18:
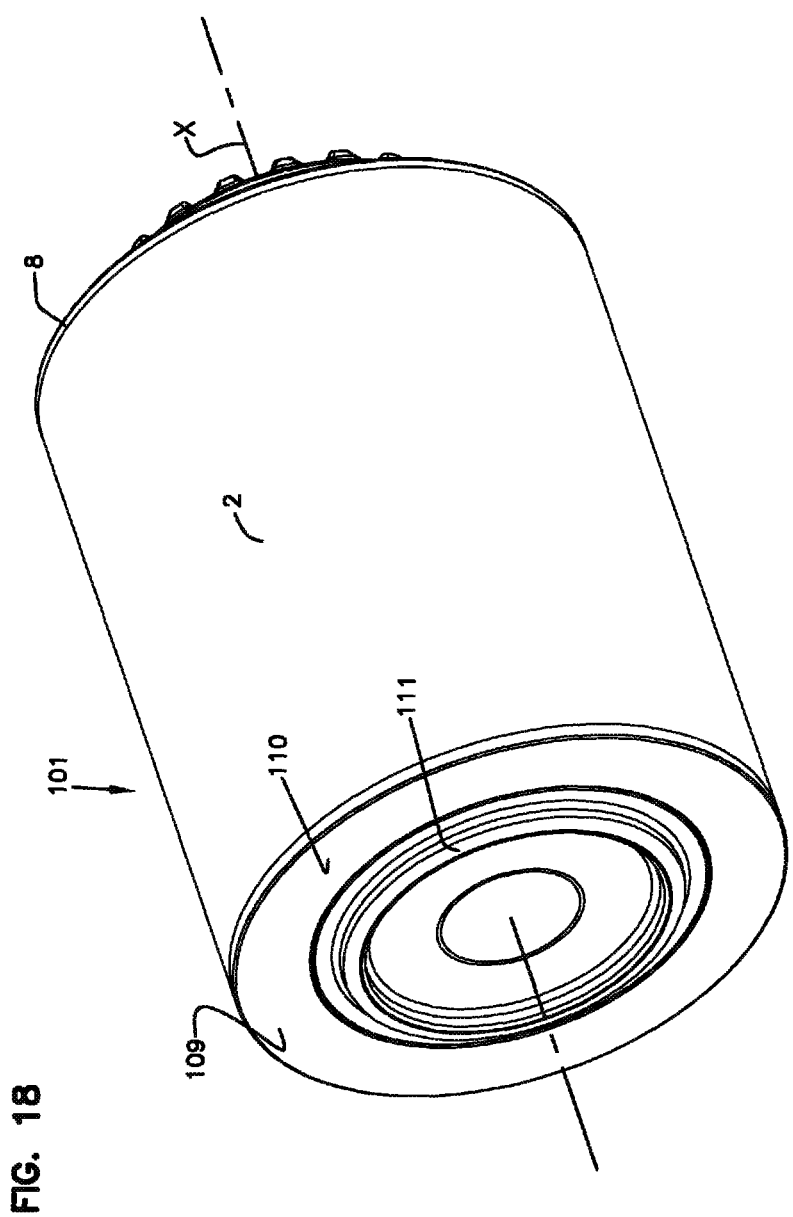
FIG. 18 is a schematic closed end perspective view of an alternate filter cartridge according to the present disclosure.
Figure 19:
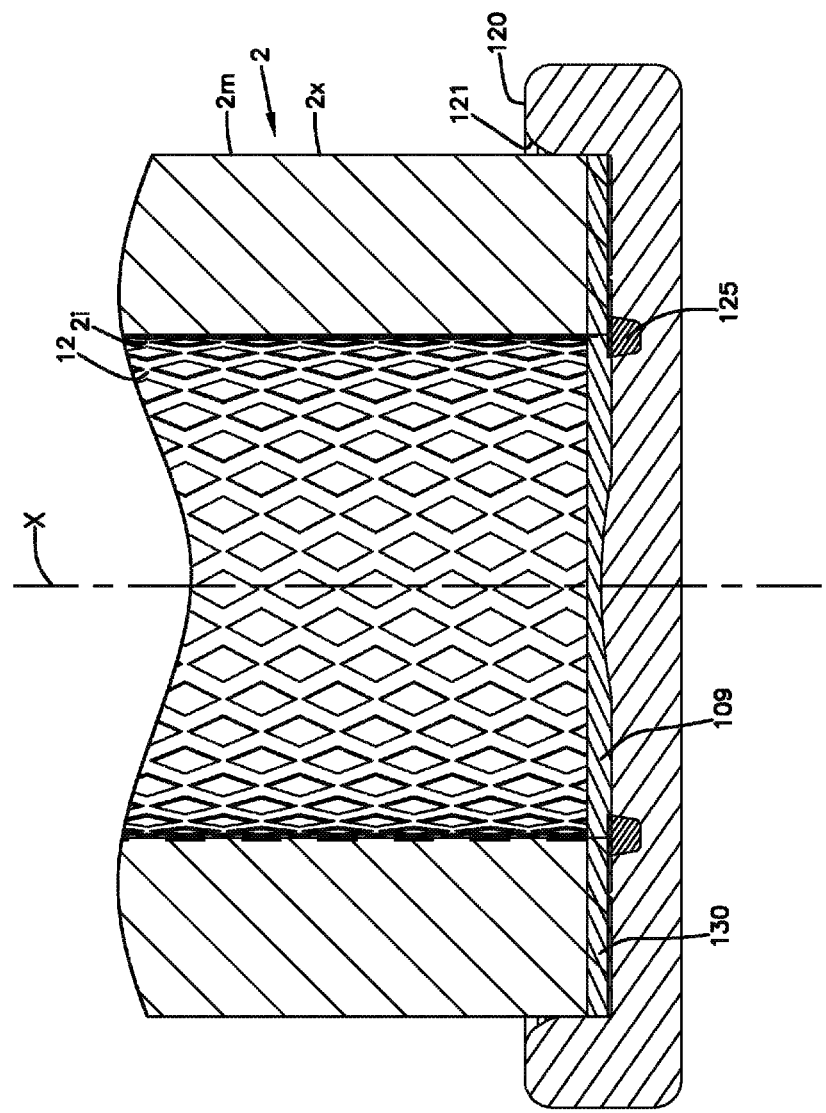
FIG. 19 is a schematic, fragmentary, cross-sectional view of a step of forming a filter cartridge in accord with FIG. 18.

An Alternative Closed End Piece, FIGS. 18-19

In FIGS. 18 and 19, an alternative closed end piece to end piece 9 is depicted. Referring to FIG. 18, a cartridge 101 is depicted. The cartridge 101 may be generally analogous to cartridge 1, except for selected construction of a closed end piece. Thus, cartridge 101 comprises media pack 2, first end piece 8 and second piece 109; the example second end piece 109 being a closed end piece. The second piece 109 comprises a molded-in-place section 110, having secured thereto a preformed compression ring 111. This construction allows the end piece 109 to have a composite construction, in which, for example, region 110 can have a first density or hardness; and, compression ring 111 can have a second or different density or hardness. Typically, when this approach is used the ring 111 will be softer and less dense, than section 110. A method for constructing such an arrangement can be understood by reference to FIG. 19.

Referring to FIG. 19, a step of molding end piece 109 is shown. Here, the media pack 2 (including optional liner 12) is inserted into a cavity 121 of a mold 120. Also, within the mold 20, is provided a preformed cushion or ring structure 125. A typical process would involve putting a preformed ring 125 in the mold 121, pouring a resin 130 appropriate for forming an end cover 110, and then inserting, into the mold, ends of a liner 12 in media 2m. As the resin 130 cures, it will secure the compression ring 125 to the remainder of the cartridge. A typical approach would be to use a related chemical (such as urethane) for both the resin 130 and the preform ring 125, formulated to cure at different densities and/or hardnesses. For example, the ring 125 could be formed from a resin similar to that used for the seal ring 16, and the resin 130 can be a resin similar to that used for the hard regions 20/21 of end piece 8 discussed above.

IV. Selected Example Features and Advantages

A. Configuration of Selected Portions of Seal Member 16 that Engage a Housing Seal Member and are Compressed Radially, During Installation Attention is now directed to FIG. 10. From a comparison of FIGS. 5 and 10, it can be understood that seal member 16 includes a seal surface portion 16s that engages a selected housing portion during use, to form a seal. For the particular example arrangement depicted, surface 16s is a radially inner surface of seal member 16. However, again, in an alternate embodiment in which the seal is radially outwardly directed, the surface portion 16s will be a radially outer portion.

The seal surface 16s preferably includes an extended section that engages the housing member to form a seal, which is devoid of any projection bump or step therein along a length of axial extension of at least 6 mm, typically at least 10 mm and often at least 12 mm, for example 12-20 mm, inclusive. This length of extension is at least a portion of the region shown in FIG. 5, where indicated by dimension XA. Thus, preferably, surface 16s in this region is smooth and without substantial surface disruption.

Preferably surface 16s along the same region of extension, i.e. the portion that forms a seal with a housing seal member, extends nearly parallel to central axis X, typically with only a minor angle therein, for example as a draft angle provided in the molded configuration during formation to facilitate de-molding, from a process such as shown in FIG. 13 and discussed above. Such an angle will typically be not greater than 2°, typically not greater than 1°, for example about 0.2°-0.7° Stated with respect to a plane perpendicular to the axis X, typically the angle is not less than 88° usually not less than 89°, often 89.3-89.8°. For the view shown in FIG. 10, the draft angle would be the slant (typically inwardly) in extension between about region F and region G. If the seal member 16 were configured as an outwardly directed seal, it would be a slant (typically outwardly) between analogous regions.

The particular end piece 8 depicted is shown with a radial inward chamfer or boot section 21b adjacent base 16b, FIG. 10. The boot section 21b provides stability for end 16b and for engagement with liner 12.

Still referring to FIG. 10, it is noted that in extension axial toward media pack 2, along the seal section 16s, as a result of the thickness of the seal region 16 and the slant of the support wall 20i, the amount of material in the region 16 becomes progressively thicker in extension in a direction between locations F and G. Typically, the seal 16 is configured to be at least 5 mm, often at least 9 mm thick, typically at least 7 mm thick, usually 7-18 mm thick and usually not more than 20 mm thick, at an axial location of engagement during sealing most remote from the media pack 2, for example at about F; and, the seal material 16 is configured to be at least 9 mm thick, typically at least 15 mm thick; and, usually at least 4 mm thicker (typically at least 5 mm thicker) at a location adjacent region G, i.e. adjacent a portion of surface 16s that forms a seal most closely positioned adjacent media 2, axially, relative to region F. The dimensions indicated in this section are meant to be when the material of region 16 is in a relaxed state, i.e., when the cartridge 1 is not installed.

Typically, the compressibility of material of the seal member 16 is relatively constant throughout. Thus, if the structure around which seal surface 16s is of relatively little taper, relative to central axis X, as the cartridge 1 is positioned, the highest amount (99.9% of thickness) of compression will occur initially in region F, and as further insertion occurs, the force that is needed to move the cartridge 1 increases relatively slowly, since the material of the seal member 16 has a greater radial distance over which to compress, with the total amount of compression in the region indicated at XB, FIG. 5, as measured by mm of displacement of seal member 16 radially, remaining relatively constant.

Also, since in the region G, the seal material 16 overall is not compressed as much (99.9% of thickness) as in region F, the cartridge at end piece 9 can be rocked relatively easily, to facilitate disengagement of the cartridge 1 with the housing, during servicing. That is, as the cartridge 1, when installed in a housing is grasped for dislodging, material in region G, which is not as compressed as in region F, allows the cartridge to easily be rocked, with the material in region G being alternately, compressed and released, during the rocking. This is desirable, to facilitate removal of the cartridge.

Further, during installation, the greatest amount of compression in the seal (99.9% of thickness), during installation, will be in region F. As further insertion occurs, when the material of member 16 is deflected by the structure against which it is compressed, through its thickness, the shape of support 20 allows the member 16 to absorb the compression over a wider radial range, resisting further compression installation to a lesser degree than the initial compression. This facilitates installation, to advantage.

B. Advantages Relating to Molding the End Piece from a Relatively Hard Material that does not Rise Substantially During Cure In preferred applications of the techniques described herein, the end cap piece material that forms the end cap section 21 and the support section 20 is a relatively hard material that does not increase in volume substantially during cure. As indicated, preferably it is a material that, if it increases in volume at all, does not increase in volume more than 30% preferably not more than 20%, most preferably no more than 15%. Advantages are obtained from this. These can be understood in part by reference to the FIG. 10.

In particular, adjacent the media pack outer perimeter 2x, the end piece 8 needs to fully encompass the media 2, to ensure end cap sealing. However, it does need to project radially outwardly from the media pack 2x substantially. Typically, when a free rise, highly foamed, urethane or similar material is used to mold the end piece 8 in place, there will need to be an allowance for a substantial expansion of the material radially outwardly from the outer perimeter 2x. However, when a relatively low free-rise, low volume increase, material is used, there will not need to be substantial expansion of the material radially outwardly from the outer perimeter 2x of the media. Typically, in a preferred material as characterized herein, is used, the amount of radial reach or extension of the end piece 8 radially outwardly from adjacent portions 2x of the media pack is no greater than 2 mm, typically no greater than 1.5 mm, and often no greater than 1 mm. Advantages from this relate in part, to advantageous use of media volume. That is, within the same cartridge perimeter volume, the media pack can have a large radially outer reach, which means more media is present. When more media is present, the net result is the ability for a longer cartridge life within the same volume; or, the use of a smaller volume to obtain the same cartridge life.

A similar observation can be made with respect to the end piece 8 adjacent the inner perimeter 2i of the media pack. Here, generally, the radial extension inwardly adjacent the media pack 2i is no more than 2 mm, typically no more than 1.5 mm and often no more than 1 mm. Again, this results in efficient use of media pack volume and related advantages identified above.

It is noted that with respect to the radial outward dimension and radial inward dimension of the end piece 8, reference was made to adjacent portions of a media pack 2. This would relate to any adjacent portion of the media pack, i.e. for example the combination of the media and any liner present. In the example depicted, at the outer perimeter 2x no liner is present, so the dimension is also with respect to the media 2m. At the inner perimeter 2i a liner 12 is present, so the reference is meant to a dimension radially inwardly from the liner 12.

V. Summary and Observations

According to an aspect of the present disclosure, a filter cartridge is provided. The filter cartridge generally comprises a media pack including media, having an end. The media pack can be configured around an open filter interior.

A first end piece having a central aperture therethrough is provided on the end of the media pack. The first end piece can be molded-in-place on the end of the media pack, to completely close the end of media pack and to have media embedded therein.

The end piece generally includes an end cap section and a seal support section. The seal support section is configured to define a seal recess in cooperation with the end cap section.

The seal support section projects axially from the media pack and media, but generally not perpendicularly to a central access through the central aperture. Typically, it slants either toward or away from the central aperture and axis. That is, typically, the seal support section defines a seal support wall that slants radially in extension away from the end cap section, to define a seal recess.

In a typical arrangement, the end cap section and the seal support section are integral with one another.

A housing seal member is positioned in the seal recess. Typically, it is non-removably secured within the seal recess, and configured to form a radially directed seal with a housing component when the filter cartridge is installed for use. The housing seal member can be configured to form a radially inwardly directed seal with a seal component, or a radially outwardly directed seal with a housing seal component. Typically, the seal support is positioned so that when a housing seal member forms a radially directed seal, it is compressed between the housing member and a housing seal support.

The seal support typically defines a seal support wall that slants radially in extension away from the end cap section at an acute wall angle within the range of 30°-80°, inclusive.

Typically, the end piece is molded-in-place on a first end of the media pack and defines a radial seal support, while being molded to secure the housing seal member (provided as a preformed housing seal member) in place on the cartridge and to the media pack.

Typically, the media pack (and media) surrounds and defines an open filter interior with a central axis coaxial with a central axis of the aperture through the first end piece and the seal. Typically, the end cap section extends completely across, and closes, the first end of the media pack and media. Typically, the first end cap section and seal support section are molded integral with one another. Also, typically, the media is pleated. Typically, an acute angle of extension of the support wall is within the range of 30°-80°, inclusive, in extension axially away from the media, and an end cap section relative to a plane perpendicular to a central axis. More typically, this angle is within the range of 45°-80°, often 50°-80°, and in many instances 55°-75°, inclusive, as an example, 60°-75°, inclusive.

Typically, the housing seal member comprises a portion of a resilient, compressible member having a seal surface. The resilient, compressible, member can be configured to extend, axially, further away from the media than does the seal support, to advantage. When this is the case, typically an amount of further extension is at least 2 mm, usually at least 4 mm and often at least 5 mm.

The tip of the resilient (and typically compressible) member remote from the media can be configured to comprise a plurality of spaced projections extending, axially, away from the media. Preferably, portion of the resilient (and typically compressible) member adjacent to the tip comprises a plurality of space projections and recesses, with both portions of the projections and portions of the recesses comprising material of the resilient member extending axially further away from the media than does any portion of this seal support.

In an example described, the media or media pack has an outer perimeter and the end cap projection on the first end piece does not extend radially beyond an adjacent portion of the outer perimeter media pack any further than 2 mm, typically any further than 1.5 mm and preferably any further than 1 mm.

Further, typically media pack has an inner perimeter, and the end cap section adjacent the first end piece does not extend radially beyond an adjacent portion of the inner perimeter of media or media pack any further than 3 mm, typically any further than 2 mm and often any further than 1.5 mm (indeed no greater than 1 mm is preferred).

In an example described, the first end piece comprises a molding having an as molded density of at least 0.4 g/cc; typically at least 0.46 g/cc; and often a density within the range of 0.51-0.63 g/cc, inclusive. Typically, the first end piece comprises a molding having a hardness, Shore A, of at least 30, typically at least 35, usually not greater than 75, and often within the range of 40-60, inclusive.

Typically, the seal member comprises a molding having a density no greater than 0.32 g/cc, typically no greater than 0.24 g/cc. It typically comprises a molding have a hardness, Shore A, of no greater than 20, typically no greater than 18 and often within the range of 10-18, inclusive.

Typically, when made together, the first end piece comprises a first molding having a first density and the seal member comprises a second molding having a second density, the first density being greater than the second density, typically at least 0.08 g/cc greater, usually at least 0.2 g/cc greater.

Typically the seal member defines a seal surface, i.e. a surface that engages a portion of a housing, in use, with a length of axial extension of at least 5 mm, typically at least 10 mm, and preferably at least 12 mm, wherein the seal surface does not have a radial step in that section. Typically the seal member surrounds and defines a central cartridge axis, and the seal member defines a seal surface section that engages a housing structure to form a seal therewith in use, that extends at an angle, relative to a plane perpendicular to the cartridge central axis, of at least 80°, typically at least 83°, often at least 85°, and typically within the range of 85°-89.9°, inclusive, for example 88°-89.7°, often 89.3-89.7°.

In a typical example, the housing seal member has a first portion with a first radial thickness from the seal surface to the seal support section; and, a second portion with a second radial thickness from the seal surface to the seal support section. Typically, the second radial thickness is at least 4 mm greater, usually at least 5 mm greater, than the first radial thickness. Also, typically the portion with a second radial thickness is closer to the media, than is the portion with the first radial thickness. As discussed above, an advantage of this is that it can allow for a convenient rocking of the cartridge, when engagement with the housing, to facilitate removal/installation.

Typically, the first radial thickness is at least 7 mm, usually at least 9 mm.

In an example described, a central liner is provided, for example an expanded liner. In an alternate application, the central liner can be plastic. In some applications, the central liner can be avoided. In a typical application, the first end piece defines a circular outer perimeter, and a circular central aperture, although in each instance alternatives are possible.

In an example arrangement described, a second end piece is positioned on a media pack end opposite the first end piece. The second end piece can be molded-in-place, and will typically be a closed end cap, although alternatives are possible. In an example described the second end piece has a density of at least 0.4 g/cc, typically at least 0.46 g/cc, but alternatives are possible.

Typically, the first end piece comprises a thermoplastic elastomer and a seal member comprises a thermoplastic elastomer each being formed from a thermoplastic elastomer generally related to a elastomer of the other. In an example described, each is formed from polyurethane.

Herein, a filter assembly is generally described, which comprises a housing having a filter cartridge in accord with the filter cartridge characterizations described herein, removably installed in an interior of the housing and radially sealed to a housing component. The filter assembly can, for example, comprise an air cleaner assembly.

Herein, methods of forming a filter cartridge are described. The methods generally involve molding-in-place, on a media pack at a location extending between the media pack and a housing seal member, an end piece having a central aperture. When this is practiced, the end piece generally includes an end cap section secured to the media pack at the media pack first end and a radial seal support section for the housing seal member. The step of molding includes non-removably securing the housing seal member to the end piece.

In a typical approach, the step of molding comprises positioning a preformed housing seal member in a mold, along with resin for an end piece of the mold and positioning an end of the media in the mold.

Advantageous filter cartridges made in accord with this process are described.

What is claimed is:

1. An air filter cartridge for removable installation in an air cleaner housing for use; the air filter cartridge comprising:
    (a) a media pack comprising pleated media having a first end; and,
    (b) a first end piece extending completely across the first end of the media pack, from an outer media perimeter to an inner media perimeter; the first end piece having a central aperture therethrough and including a housing seal member and seal support thereon;
       (i) the housing seal member being configured to form a radially inwardly directed seal with a housing component, when the filter cartridge is installed in a housing for use;
          (A) the housing seal member comprising a portion of a resilient member having a seal surface; and,
          (B) the resilient member extending to a tip remote from the media pack;
             (1) the tip of the resilient member remote from the media pack comprising a plurality of spaced projections extending, axially, away from the media pack; and,
       (ii) the seal support comprising a support member on an opposite side of the resilient member from the seal surface;
          (A) the resilient member extending, axially, to a location further away from the media pack than does the seal support; and,
          (B) the seal support comprises a support wall that slants radially inwardly in extension away from the media.

2. An air filter cartridge according to claim 1 wherein:
    (a) the media pack surrounds and defines a central cartridge axis; and,
    (b) the seal support includes a support wall that extends, relative to a plane perpendicular to the central axis, at an acute angle within the range of 30°-80°, inclusive, in extension axially away from the media pack.

3. An air filter cartridge according to claim 1 wherein:
    (a) the media pack surrounds and defines a central cartridge axis; and,
    (b) the seal support includes a support wall that extends, relative to a plane perpendicular to the central axis, at an acute angle within the range of 45°-80°, inclusive, in extension axially away from the media pack.

4. An air filter cartridge according to claim 1 wherein:
    (a) the media pack surrounds and defines a central cartridge axis; and,
    (b) the seal support includes a support wall that extends, relative to a plane perpendicular to the central axis, at an acute angle within the range of 50°-80°, inclusive, in extension axially away from the media pack.

5. An air filter cartridge according to claim 1 wherein:
    (a) the housing seal member has a first portion with a first radial thickness, to the rigid member of the seal support, on the opposite side of the resilient member from the seal surface; and,
    (b) the housing seal member has a second portion with a second radial thickness to the support member of the seal support, on the opposite side of the resilient member from the seal surface;
       (i) the second radial thickness being at least 4 mm greater than the first radial thickness.

6. An air filter cartridge according to claim 1 wherein:
    (a) the housing seal member has a first portion with a first radial thickness, to the rigid member of the seal support, on the opposite side of the resilient member from the seal surface; and,
    (b) the housing seal member has a second portion with a second radial thickness, to the support member of the seal support, on the opposite side of the resilient member from the seal surface;
       (i) the second radial thickness being at least 5 mm greater than the first radial thickness.

7. An air filter cartridge according to claim 1 wherein:
    (a) the seal support comprises an integral portion of a molded-in-place end piece.

8. An air filter cartridge for removable installation in an air cleaner housing for use; the air filter cartridge comprising:
    (a) a media pack comprising pleated media surrounding a central axis and having a first end;
    (b) a seal support having a seal support section: the seal support section being in axial overlap with the first end of the media pack and projecting axially away from the media pack;
       (i) the seal support section defining a support wall that slants radially in a direction of extension away from the media pack and toward the central axis at an acute angle, to a plane perpendicular to the central axis, within the range of 30°-80°, inclusive; and,
    (c) a housing seal member comprising a resilient portion having a seal surface configured to form a radially inwardly directed seal with a housing component, when the filter cartridge is installed in a housing for use;
       (i) the support wall surrounding a portion of the housing seal member and being positioned on an opposite side of the resilient portion from the seal surface.

9. An air filter cartridge according to claim 8 wherein:
(a) the seal support section defining a support wall that slants radially in a direction of extension away from the media pack and toward the central axis at an acute angle, to a plane perpendicular to the central axis, within the range of 45°-80°, inclusive.

10. An air filter cartridge according to claim 9 wherein:
(a) the housing seal member has a first portion with a first radial thickness, to the rigid member of the seal support, on the opposite side of the resilient member from the seal surface; and,
(b) the housing seal member has a second portion with a second radial thickness, to the rigid member of the seal support, on the opposite side of the resilient member from the seal surface;
   (i) the second radial thickness being at least 4 mm greater than the first radial thickness.

11. A filter cartridge according to claim 10 wherein:
(a) the resilient member extends, axially, further away from the media pack than does the seal support.

12. A filter cartridge according to claim 10 wherein:
(a) the seal support extends to a seal support tip remote from the media pack; and,
(b) the resilient member extends to a tip remote from the media pack;
   (i) the tip of the resilient seal member remote from the media comprising a plurality of spaced projections extending, axially, away from the media pack.

13. A filter cartridge comprising:
(a) a media pack comprising pleated media surrounding an open interior and including media having a first end;
(b) a first end piece extending completely across the media first end, from a media outer perimeter to a media inner perimeter, and having a central aperture therethrough; the first end piece including:
   (i) an end cap section adjacent to and extending completely across the media pack first end, from the media outer perimeter to the media inner perimeter; and,
   (ii) a seal support section;
      (A) the seal support section projecting axially away from the media pack at a location in axial overlap with an end of the media; and,
      (B) the seal support section defining a seal support wall; the seal support wall extending to a seal support tip remote from the media pack; and,
      (C) the seal support section slanting radially inwardly in extension away from the media pack;
   (iii) the end cap section and the seal support section being molded integral with one another; and,
(c) a housing seal member non-removably secured to the first end piece and configured to form a radially directed seal with a housing component, when the filter cartridge is installed for use;
   (i) the housing seal member comprising a portion of a resilient member having a radially inwardly directed seal surface;
   (ii) the resilient member extending, axially, further away from the media pack than does the seal support; and,
   (iii) the seal support surrounding a portion of the resilient member on a side thereof opposite the seal surface.

14. An air filter cartridge according to claim 13 wherein:
(a) the seal support section extends at an acute angle within the range of 30°-80°, inclusive, in extension away from the media pack.

15. A filter cartridge according to claim 13 wherein:
(a) the tip of the resilient seal member remote from the media comprises a plurality of spaced projections extending, axially, away from the media pack.

16. A filter cartridge according to claim 15 wherein:
(a) a portion of the tip of the resilient member between the spaced projections, also extends, axially, further away from the media pack than does the seal support.

* * * * *